(12) United States Patent
Culver et al.

(10) Patent No.: US 11,954,430 B2
(45) Date of Patent: Apr. 9, 2024

(54) SYSTEMS AND METHODS FOR DOCUMENT GENERATION AND SOLICITATION MANAGEMENT

(71) Applicant: Riverscape Software, Inc., Beavercreek, OH (US)

(72) Inventors: Allen Lea Culver, Beavercreek, OH (US); Andrew Johnson, Beavercreek, OH (US)

(73) Assignee: Riverscape Software, Inc., Beavercreek, OH (US)

( * ) Notice: Subject to any disclaimer, the term of this patent is extended or adjusted under 35 U.S.C. 154(b) by 0 days.

(21) Appl. No.: 18/048,280

(22) Filed: Oct. 20, 2022

(65) Prior Publication Data

US 2023/0136668 A1     May 4, 2023

Related U.S. Application Data

(60) Provisional application No. 63/257,826, filed on Oct. 20, 2021.

(51) Int. Cl.
    *G06F 40/00*      (2020.01)
    *G06F 3/0482*      (2013.01)
    *G06F 16/33*      (2019.01)
    *G06F 40/106*      (2020.01)
    *G06F 40/186*      (2020.01)

(52) U.S. Cl.
CPC .......... *G06F 40/186* (2020.01); *G06F 3/0482* (2013.01); *G06F 16/3334* (2019.01); *G06F 40/106* (2020.01); *G06F 2203/04803* (2013.01)

(58) Field of Classification Search
CPC .... G06F 40/186; G06F 40/106; G06F 3/0482; G06F 16/3334
See application file for complete search history.

(56) References Cited

U.S. PATENT DOCUMENTS

| 7,506,001 | B2* | 3/2009 | Johnson | G06Q 10/1053 |
| | | | | 705/37 |
| 7,555,441 | B2* | 6/2009 | Crow | G06Q 10/10 |
| | | | | 705/7.14 |
| 9,165,011 | B2* | 10/2015 | Wang | G06F 16/1767 |
| 10,089,585 | B1* | 10/2018 | Alexander | G06Q 10/06398 |

(Continued)

FOREIGN PATENT DOCUMENTS

WO    WO-2020193785 A1 * 10/2020

*Primary Examiner* — Barbara M Level
(74) *Attorney, Agent, or Firm* — DINSMORE & SHOHL LLP

(57) ABSTRACT

In one embodiment, a system for generating a document includes one or more processors, and a non-transitory computer-readable medium storing instructions that cause the one or more processors to display, in an electronic display, a graphical user interface comprising a prior document section, a word processing section, and a tag query text field, receive query text from the tag query text field, retrieve one or more documents from a database having a tag corresponding to the query text, display in the prior document section a section of the one or more documents associated with the tag, receive a request to include text from the one or more documents in the prior document section in the document displayed in the word processing section, and populate the document displayed in the word processing section with the text.

6 Claims, 39 Drawing Sheets

| Capability Matrix/Team Strength | | | |
|---|---|---|---|
| Team Strength: 3.7 (Moderate Capability/Moderate PWin) | | | Toggle View Mode |
| Team Member | Overall Score | Details | |
| Creek Technologies Company | 4 | Score Breakdown | |
| Information Technology   Overall Score: 3.7 | | | |
| Skill 1 | 2 | Past Performance | |
|    Contract #: 12342    Incumbent: Yes    Prime: Yes    CPAR: Yes | | | |
|    Contract #: 42345    Incumbent: No    Prime: Yes    CPAR: No | | | |
| Skill 2 | 4 | | |
| Skill 3 | 5 | | |
| Web Development   Overall Score: 3.5 | | | |
| Skill 1 | 3 | | |
| Skill 2 | 4 | | |
| Database Administration   Overall Score: 4.7 | | | |
| Skill 1 | 5 | | |
| Skill 2 | 5 | | |
| Skill 3 | 4 | | |
| Riverscape Software, Inc. | 3.6 | Score Breakdown | |
| Lions Technology Services | 3.5 | Score Breakdown | |

(56) References Cited

U.S. PATENT DOCUMENTS

| | | | | |
|---|---|---|---|---|
| 10,311,529 B1* | 6/2019 | Noel | ................... | G06Q 30/0611 |
| 10,339,502 B2* | 7/2019 | Kurjanowicz | ........ | G06F 16/287 |
| 10,600,105 B1* | 3/2020 | Kumar | ............... | G06Q 30/0637 |
| 10,713,425 B2* | 7/2020 | Dent | ....................... | G06F 16/93 |
| 10,783,496 B2* | 9/2020 | Herman | ............. | G06Q 10/1053 |
| 11,182,707 B2* | 11/2021 | Sahni | ............. | G06Q 10/063112 |
| 2001/0051913 A1* | 12/2001 | Vashistha | ................ | G06Q 40/04 |
| | | | | 705/37 |
| 2002/0111839 A1* | 8/2002 | Nayak | .................... | G06Q 20/20 |
| | | | | 705/16 |
| 2004/0039681 A1* | 2/2004 | Cullen, III | ............. | G06Q 10/10 |
| | | | | 705/37 |
| 2006/0229896 A1* | 10/2006 | Rosen | ................ | G06Q 10/1053 |
| | | | | 705/321 |
| 2012/0072299 A1* | 3/2012 | Sampsell | ........... | G06Q 30/0611 |
| | | | | 705/26.4 |
| 2014/0289145 A1* | 9/2014 | Coleman | ............ | G06Q 10/1053 |
| | | | | 705/321 |
| 2015/0088567 A1* | 3/2015 | Lambroschini | .............................. | |
| | | | | G06Q 10/063112 |
| | | | | 705/7.14 |
| 2017/0116575 A1* | 4/2017 | DeGoler | ............ | G06Q 10/1053 |
| 2018/0144305 A1* | 5/2018 | Kenthapadi | .......... | G06Q 10/103 |
| 2018/0246479 A1* | 8/2018 | Judd | ....................... | G06Q 50/06 |
| 2018/0365628 A1* | 12/2018 | Bhaskaran | ..... | G06Q 10/063112 |
| 2019/0130464 A1* | 5/2019 | Yao | ......................... | G06F 7/026 |
| 2020/0034777 A1* | 1/2020 | Amato | ........... | G06Q 10/063112 |
| 2020/0126136 A1* | 4/2020 | Rajbhoj | .................. | G06F 40/30 |
| 2020/0349521 A1* | 11/2020 | Clark | .................. | G06F 16/9535 |
| 2023/0112486 A1* | 4/2023 | Srivastava | ........... | G06Q 10/103 |
| | | | | 705/7.14 |

* cited by examiner

Proposal Repository / IS DEMO Upload / Edit    ◇View  ⬇Download  ⬆Upload Proposal  ✎Proposal Generator Menu
- Folders (3)
- Images (5)
- Tags (10)
- Import Rules (9)

Meta Information

| | |
|---|---|
| Title* | IS DEMO Upload |
| Folder* | Technical Volumes (1 Proposals) ▸ ✕ |
| Related Solicitation | Sample Solicitation 1 (12345) ▸ ✕ |
| Date Submitted | Select date proposal was submitted |

Save    Cancel

Assigned Tags

| Section | | Action |
|---|---|---|
| h1 Introduction | Introduction ✕ Enter existing or new tag then hit enter or tab to apply it | 🗑 Delete |
| h1 Technical Approach | Technical Approach ✕ Enter existing or new tag then hit enter or tab to apply it | 🗑 Delete |
| h2 Technical Service Delivery – Client Sy... | Enter existing or new tag then hit enter or tab to apply it | 🗑 Delete |

Technical Service Delivery – Client Systems Technician Services

Team CompanyX Offers a solution that provides outstanding customer support at the lowest cost to the government with minimized risk...

Team CompanyX risk management occurs at all levels, Serving as an integral part of the contract and technical performance. Our risk M...

Mitigation Plan

Risk Description
Technical Transition Risks
To minimize the risk during transition, Team CompanyX will draw upon the contract familiarity of an incumbent teammate to capture and...
Personal Disruption Risk
To maintain qualified personnel, Team CompanyX has a strong benefits and compensation plan that is reviewed anually that provides: 1) an...
Table 2 – Risk Mitigation Plan

Government Solicitations / Add

Menu
Solicitations (4)
Teaming Contracts (1)
IDIQs (4)
Agencies/Customers (27)
Capabilities/Requirements (321)
NAICS Codes (1029)
QMS Codes (11)
Diversity Certifications (16)
Contacts (2)

Solicitation Information

(i) Fields with a * are required

| Field | Value |
|---|---|
| Auto Team | × Riverscape Software, inc. |
| Type* | Select Type |
| Status* | Select Status |
| Title* | Enter Solicitation title |
| Number* | Enter solicitation number |
| IDIQ* | Select IDIQ |
| Agency* | Select Agency |
| Required Clearance* | Select Clearance |
| Performance Location* | Search locations by city name |
| Solicitation Date* | Select date agency issued solicitation |
| Teaming Deadline* | Select deadline for teams to partner up |
| Submission Date* | Select date solicitation is/was due to agency |
| NAICS Codes* | None selected |
| Capability Requirements | None selected |
| Teaming Contracts | None selected |
| Solicitation Contacts | None selected (maximum 3). |

FIG. 18

| Government Solicitations / Capabilities / Requirements | 1902 | | |
|---|---|---|---|
| Menu | Capabilities / Requirements | + Add Capabilities | |
| Solicitations (4) | | Search capabilities | |
| Teaming Contracts (1) | Workforce Development | Added Jan 14, 2022 3:55 PM | Modified Jan 14, 2022 3:55 PM | Delete |
| IDIQs (4) | Work Order/Service Requests | Added Jan 14, 2022 3:55 PM | Modified Jan 14, 2022 3:55 PM | Delete |
| Agencies/Customers (27) | Wireless Network | Added Jan 14, 2022 3:55 PM | Modified Jan 14, 2022 3:55 PM | Delete |
| Capabilities/Requirements (321) | Wireless Device Admin | Added Jan 14, 2022 3:55 PM | Modified Jan 14, 2022 3:55 PM | Delete |
| NAICS Codes (1029) | Windows Server Admin | Added Jan 14, 2022 3:55 PM | Modified Jan 14, 2022 3:55 PM | Delete |
| QMS Codes (11) | Website Development | Added Jan 14, 2022 3:55 PM | Modified Jan 14, 2022 3:55 PM | Delete |
| Diversity Certifications (16) | Web Portal Security | Added Jan 14, 2022 3:55 PM | Modified Jan 14, 2022 3:55 PM | Delete |
| Contacts (2) | Web Support | Added Jan 14, 2022 3:55 PM | Modified Jan 14, 2022 3:55 PM | Delete |
| | Web Programming | Added Jan 14, 2022 3:55 PM | Modified Jan 14, 2022 3:55 PM | Delete |
| | Web Portal Development | Added Jan 14, 2022 3:55 PM | Modified Jan 14, 2022 3:55 PM | Delete |
| | Web Development | Added Jan 14, 2022 3:55 PM | Modified Jan 14, 2022 3:55 PM | Delete |

Solicitations *Explorer* / Sample Solicitation 1

| Solicitation ▼ | Teaming in Progress ▼ | OASIS | Defense Logistics Agency | Secret Clearance | Columbus, Ohio | 512110 | #12345 | 📑 1 Notes | 📊 View Matrix | 👥 Invite to Team | 👤 Invite by Selection | ✎ Edit |

ⓘ ID 1 Published May 30 Team By Jun 29 [Past Due] Bid Due Jul 27, 2022 [Past Due]

Teaming Partners
Riverscape Software Inc.

Capabilities Requirements
3D Modeling
3D Simulation

Solicitation Files
PWS (4KB)
Solicitation Information (42 KB)

Teaming Contract(s)
Company X Teaming Agreement (42 KB)

Contacts
John Doe
Jane Doe

⚠ Teaming Requests
No outstanding requests.

⚠ Teaming invites
No outstanding invites.

⚠ Edit Matrix Requests
No outstanding requests.

📑 Notes

✎ Add Note

FIG. 22

Government Solicitations

Menu
- Solicitations (4)
- Teaming Contracts (1)
- IDIQs (4)
- Agencies/Customers (27)
- Capabilities/Requirements (321)
- NAICS Codes (1029)
- QMS Codes (11)
- Diversity Certifications (16)
- Contacts (2)

Solicitations

Displaying search result. [Show all solicitations]

Search solicitations

| | | |
|---|---|---|
| Sample Solicitation 1 | OASIS | Added: Apr 12, 2022 3:56 PM |
| Columbus, Ohio | Defense Logistics Agency | Modified: May 31, 2022 10:44 AM |
| ID 1 / Solicitation / 12345 | Secret | Date Released: May 30, 2022 12:00 AM |
| ✖ Capability Matrix ☐ Deactivate Matrix | Teaming in Progress | Teaming Deadline: Jun 29, 2022 12:00AM |
| | | Proposal Due: Jul 27, 2022 12:00 AM |

✎ Edit  📁 Files  🗑 Delete

+ Add Solicitation

Page 1 of 1 (1 items)

| Capability Matrix/Team Strength | | | |
|---|---|---|---|
| | | | Toggle View Mode |
| Team Strength: 3.7 (Moderate Capability/Moderate PWin) | | | |
| Team Member | Overall Score | Details | |
| Creek Technologies Company | 4 | | Score Breakdown |
| Information Technology  Overall Score: 3.7 | | | |
| Skill 1 | 2 | | Past Performance |
| Contract #: 12342 | Incumbent: Yes | Prime: Yes | CPAR: Yes |
| Contract #: 42345 | Incumbent: No | Prime: Yes | CPAR: No |
| Skill 2 | 4 | | |
| Skill 3 | 5 | | |
| Web Development  Overall Score: 3.5 | | | |
| Skill 1 | 3 | | |
| Skill 2 | 4 | | |
| Database Administration  Overall Score: 4.7 | | | |
| Skill 1 | 5 | | |
| Skill 2 | 5 | | |
| Skill 3 | 4 | | |
| Riverscape Software, Inc. | 3.6 | | Score Breakdown |
| Lions Technology Services | 3.5 | | Score Breakdown |

FIG. 35

| Capability Matrix/Team Strength | | | | |
|---|---|---|---|---|
| ❈ Team Strength: 3.7 (Moderate Capability/Moderate PWin) | | | | Toggle View Mode |
| Team Member | Creek Technologies Company | Riverscape Software, Inc. | Lions Technology Services | |
| Overall Score | [4] | [3.6] | [3.5] | |
| Information Technology 3.4 | [3.7] | [3.7] | [2.7] | |
| [2.7] Skill 1 | 2 | 2 | 4 | |
| [3.3] Skill 2 | 4 | 4 | 2 | |
| [4] Skill 3 | 5 | 5 | 2 | |
| Web Development 3.3 | [3.5] | [3.5] | [3] | |
| [2.7] Skill 1 | 2 | 2 | 2 | |
| [4] Skill 2 | 4 | 4 | 4 | |
| Database Administration 4.4 | [4.7] | [3.7] | [4.7] | |
| [3.7] Skill 1 | 5 | 2 | 4 | |
| [4.7] Skill 2 | 5 | 4 | 5 | |
| [4.7] Skill 3 | 4 | 5 | 5 | |

FIG. 36

Menu
- Solicitations (1)
- Teaming Contracts (1)
- Capabilities/Requirements (9)
- IDIQs (1)
- Agencies (26)
- Contacts (1)
- Security Clearances (3)
- NAICS Codes (66)
- QMS Codes (11)

Solicitation Information

ⓘ Fields with an * are required

| Type* | Solicitation | > |
| Status* | Teaming in Progress | > |
| Title* | Sample Solicitation | |
| Number* | 12345 | |
| IDIQ* | OASIS | > |
| Agency* | Customs Border Protection | > |
| Required Clearance* | Secret | |
| Performance Location* | Dayton, Ohio | |
| Solicitation Date* | 2021-10-01 | |
| Teaming Deadline* | 2021-10-20 | |
| Submission Date* | 2021-11-03 | |
| NAICS Codes Show List | 541330 (Systems Engineering) x | Search for/select relevant NAICS codes |
| Capability Requirements Show List | Help Desk Support x | Search for/select capability requirements |
| Capability Requirements | Teaming Agreement 38483 x | Search for/select teaming contract files |
| Solicitation Contacts | John Doe (johndoe@riverscapesoftware.com) x | Search for/select solicitation contacts |

Save    Cancel

FIG. 37

SYSTEMS AND METHODS FOR DOCUMENT GENERATION AND SOLICITATION MANAGEMENT

CROSS-REFERENCE TO RELATED APPLICATIONS

The present application claims priority to U.S. Provisional Application No. 63/257,826 entitled "DOCUMENT GENERATION AND SOLICITATION MANAGEMENT SYSTEMS," filed on Oct. 20, 2021, the contents of which are incorporated by reference in its entirety.

FIELD

The present disclosure generally relates to document generation and solicitation management systems. More particularly, the disclosed embodiments relate to a web-based software application or a software application that operates in conjunction with and/or may be embedded as part of other software applications.

BACKGROUND

Conventionally, solicitations for the completion of projects, e.g., defense contracts, construction projects, and the purchase or sale of various goods and services, involve the distribution of the solicitation to various parties. These parties may spend a lot of time and resources reviewing the detailed requirements enumerated in the solicitation and manually preparing responses to the solicitation in the form of proposals. The majority of the proposal response drafting process still relies heavily on manual efforts. Moreover, reliance on previously drafted proposal responses to generate new proposals has pitfalls as well because previous proposals and new proposals may have significant differences with respect to one or more requirements.

SUMMARY

Embodiments of the present disclosure facilitate the analysis of digital content within digital documents in the form of solicitations, automatically identify parties with capabilities that match or satisfy the requirements enumerated in the solicitations, and enable generation of additional digital documents that are responsive to the solicitations. The generation of the additional documents may be based on user interaction with a user interface.

In one embodiment, a system for generating a document includes one or more processors, and a non-transitory computer-readable medium storing instructions that cause the one or more processors to display, in an electronic display, a graphical user interface comprising a prior document section, a word processing section, and a tag query text field, receive query text from the tag query text field, retrieve one or more documents from a database having a tag corresponding to the query text, display in the prior document section a section of the one or more documents associated with the tag, receive a request to include text from the one or more documents in the prior document section in the document displayed in the word processing section, and populate the document displayed in the word processing section with the text.

In another embodiment, a system for responding to a solicitation includes one or more processors, and a non-transitory computer-readable medium storing instructions that cause the one or more processors to receive a solicitation document, wherein the solicitation document includes a plurality of requirements, compare the plurality of requirements against a plurality of capabilities of a plurality of members, generate a strength score for one or more members based at least in part on the comparison of the plurality of requirements against the plurality of capabilities, and display the one or more members in an electronic display.

In yet another embodiment, a method for responding to a solicitation includes receiving a solicitation document, wherein the solicitation document includes a plurality of requirements, comparing the plurality of requirements against a plurality of capabilities of a plurality of members, generating a strength score for one or more members based at least in part on the comparison of the plurality of requirements against the plurality of capabilities, and displaying the one or more members in an electronic display.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 1 illustrates an example home page according to one or more embodiments described and illustrated herein;

FIG. 8 illustrates an example proposal repository page according to one or more embodiments described and illustrated herein;

FIGS. 10 and 11 illustrate an example proposal repository page providing section tags according to one or more embodiments described and illustrated herein;

FIG. 13 illustrates an example rule import page according to one or more embodiments described and illustrated herein;

FIG. 17 illustrates an example solicitations page listing a plurality of solicitations according to one or more embodiments described and illustrated herein;

FIG. 18 illustrates an example page for adding a solicitation according to one or more embodiments described and illustrated herein;

FIG. 19 illustrates an example page listing capabilities and requirements according to one or more embodiments described and illustrated herein;

FIG. 20 illustrates an example solicitation explorer page according to one or more embodiments described and illustrated herein;

FIG. 21 illustrates an example teaming partners explorer page according to one or more embodiments described and illustrated herein;

FIG. 22 illustrates another example solicitation explorer page according to one or more embodiments described and illustrated herein;

FIG. 31 illustrates an example government solicitations page according to one or more embodiments described and illustrated herein;

FIG. 32 illustrates an example IDIQ page according to one or more embodiments described and illustrated herein;

FIGS. 33 and 34 illustrate additional capabilities pages according to one or more embodiments described and illustrated herein;

FIG. 35 illustrates an example strength score page according to one or more embodiments described and illustrated herein;

FIG. 36 illustrates an example team strength score for multiple members according to one or more embodiments described and illustrated herein;

FIG. 37 illustrates an example solicitation information page according to one or more embodiments described and illustrated herein;

DETAILED DESCRIPTION

Figure 2:
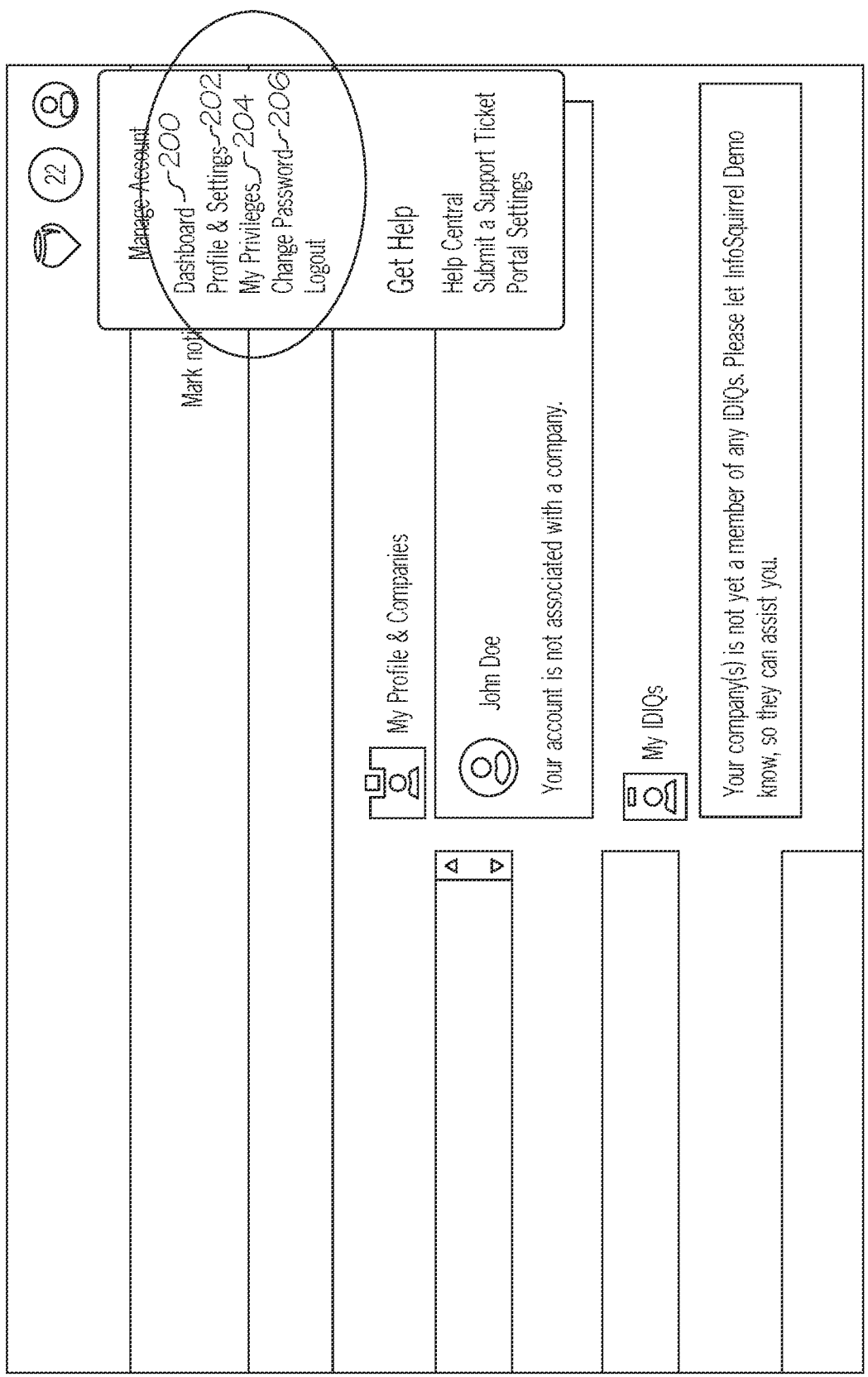
FIG. 2 illustrates an example dropdown menu of a home page according to one or more embodiments described and illustrated herein.

The embodiments of the present disclosure address and overcome the deficiencies of the conventional techniques described above. Details regarding the software application are illustrated in FIGS. 1-39 and described below.

In particular, the embodiments of the present disclosure are directed to software applications that enable users to generate proposals in response to solicitations relating to a variety of goods and services. Additionally, embodiments include features that enable the identification of various teaming members (e.g., additional users, companies, and so forth), each of whom may have a distinct set capabilities that satisfy various requirements enumerated in the solicitations. As such, a particular user may draft a satisfactory and comprehensive response to a solicitation even if the user or his company only satisfies a subset of the requirements enumerated in the solicitation. Because, in embodiments, the software application may, automatically and without user intervention, identify one or more additional users and/or companies with capabilities that satisfy the remaining requirements of the solicitation.

Figure 1:
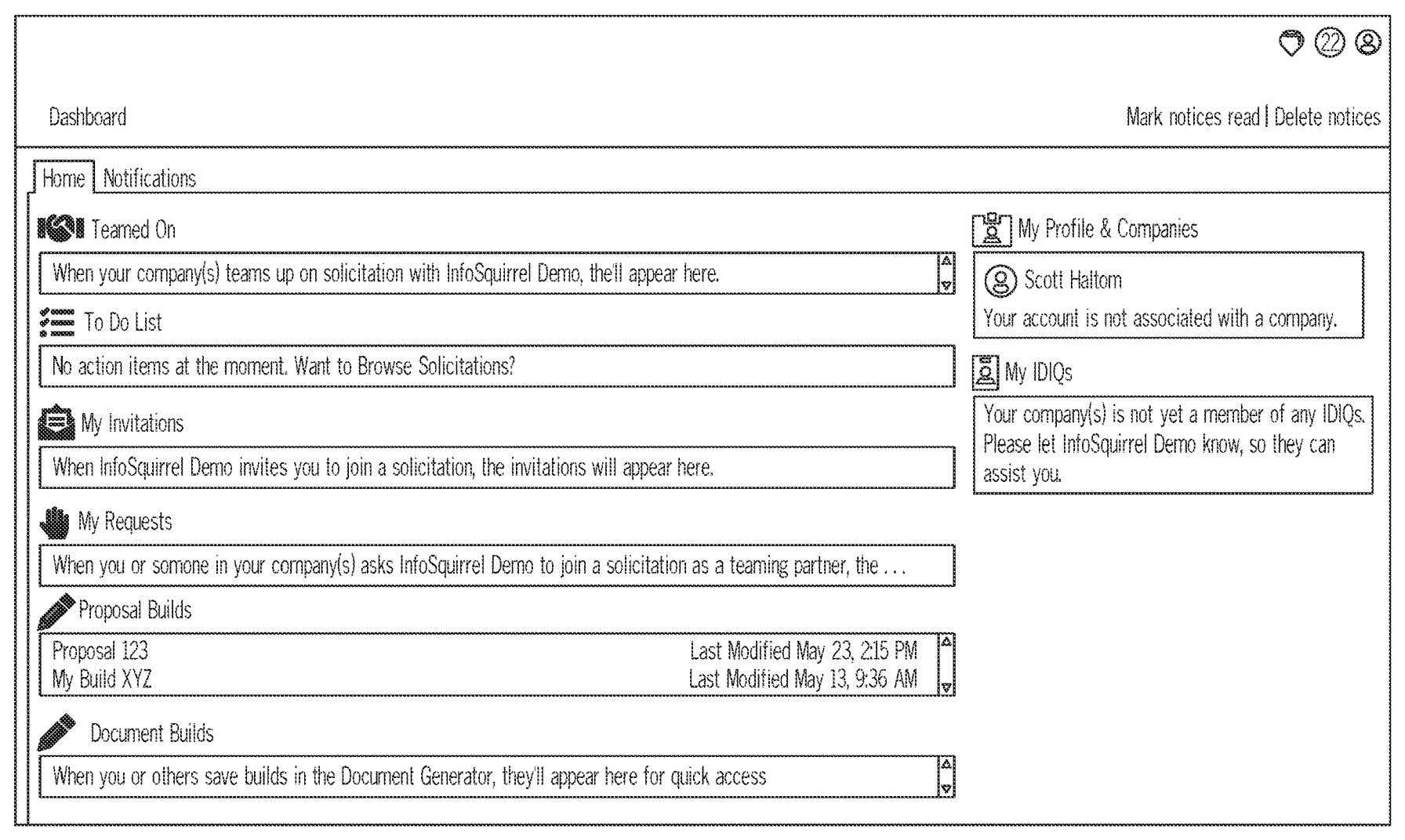

FIG. 1 depicts an example home page of a non-limiting example of the software application of the present disclosure. It should be understood that the user interfaces shown and described herein are for illustrative purposes, and may take on other configurations and layouts. In particular, a home page of the software application may be that of a dashboard with three interactive icons labeled, e.g., "Teamed On", "My Invitations", "To Do List," "My Requests," "Proposal Builds," and Document Builds.". Additionally, a "Solicitations Explorer" interactive icon may also be provided, which enables users to, upon selecting the interactive icon, search a variety of solicitations for which the company may be a good fit. In embodiments, the software application of the present disclosure may be a Software as a Service ("SaaS") product. The "Teamed On" interactive icon displays companies that a member is paired with for a solicitation. The "To Do List" interactive icon displays a list of outstanding tasks remaining for a member. The "My Invitations" interactive icon displays a list of open invitations where other companies are requesting the member to join a solicitation. The "My Requests" interactive icon lists other companies that a member has asked to join a solicitation. The "Proposal Builds" interactive icon provides access to current proposals that are being worked on. The "Document Builds" interactive icon provides access to other types of documents.

The software application that may be accessible via the internet. For example, a user may open a browser and input a universal resource locator ("url") associated with the software application, in response to which the home page as illustrated in FIG. 1 may be displayed. In embodiments, prior to the display of the home page, the user may be required to input a username and a password as part of an authentication process. Other forms of authentication are also contemplated.

FIG. 2 depicts an example dropdown menu that is available from the example home page of the software application illustrated in FIG. 1, according to one or more embodiments described and illustrated herein. In particular, the dropdown menu 200 may include various options such as profile and settings 202, privileges 204, change password option 206, and so forth. Additionally, a user may be able to select multiple companies that the user has access to, e.g., as part of the user's subscription.

Figure 3:
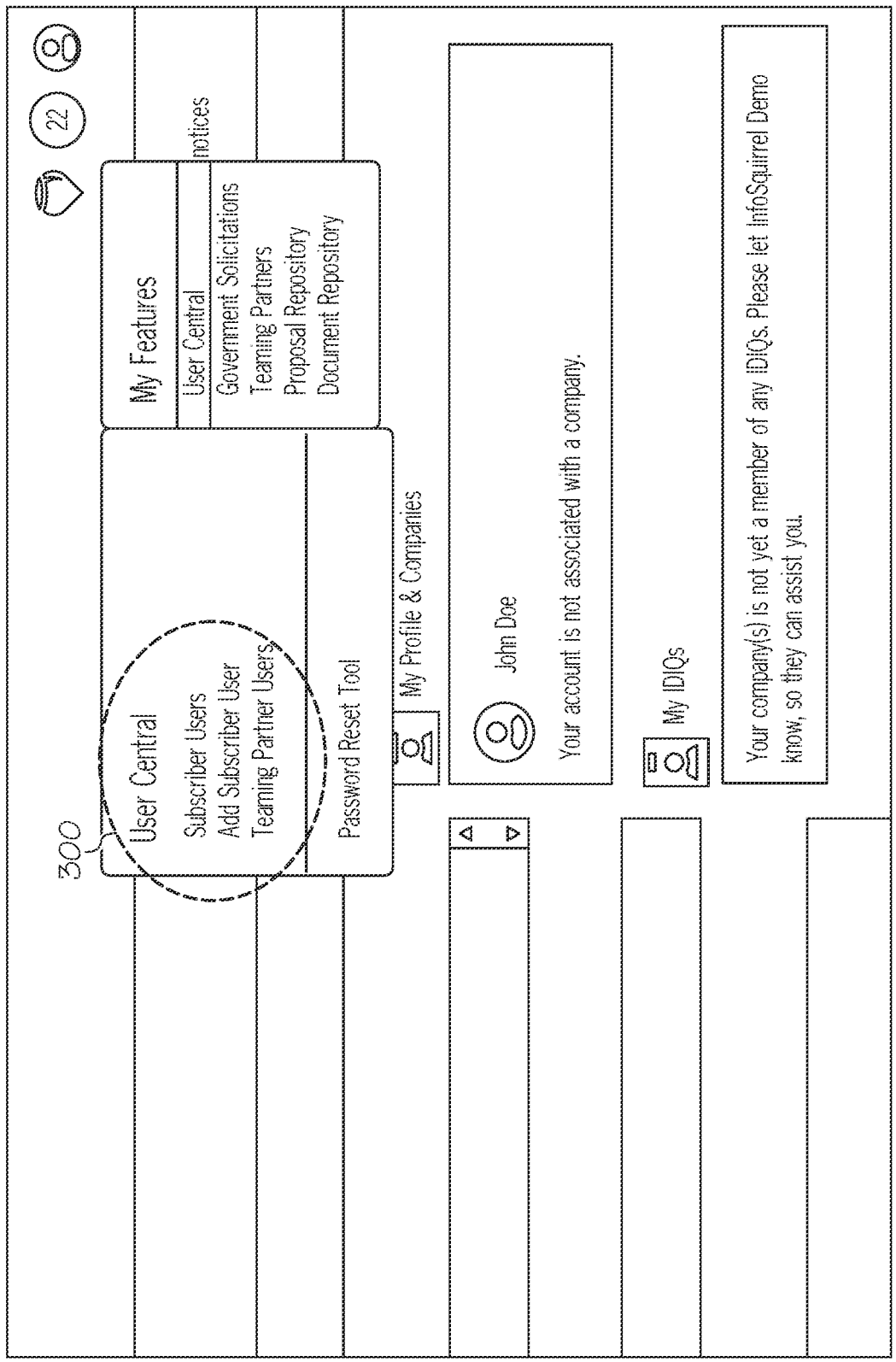
FIG. 3 illustrates another example dropdown menu of a home page according to one or more embodiments described and illustrated herein.

FIG. 3 depicts an example user management dropdown menu 300 that may be navigable from the home page, according to one or more embodiments described and illustrated herein. As illustrated, the user management dropdown menu 300 may include multiple designations, e.g., the designations of prime users that can add a variety of additional users, teaming partner companies or team member users, and so forth. In embodiments, a user that is designated as a prime user may have purchased the software application based on a monthly subscription fee, an annual subscription fee, and so forth. Additionally, a prime user may include members that are classified under different categories, e.g., moderator, administrator, and so forth. The administrator may have access to a larger range of features and functionalities as compared to the moderator.

Figure 4:
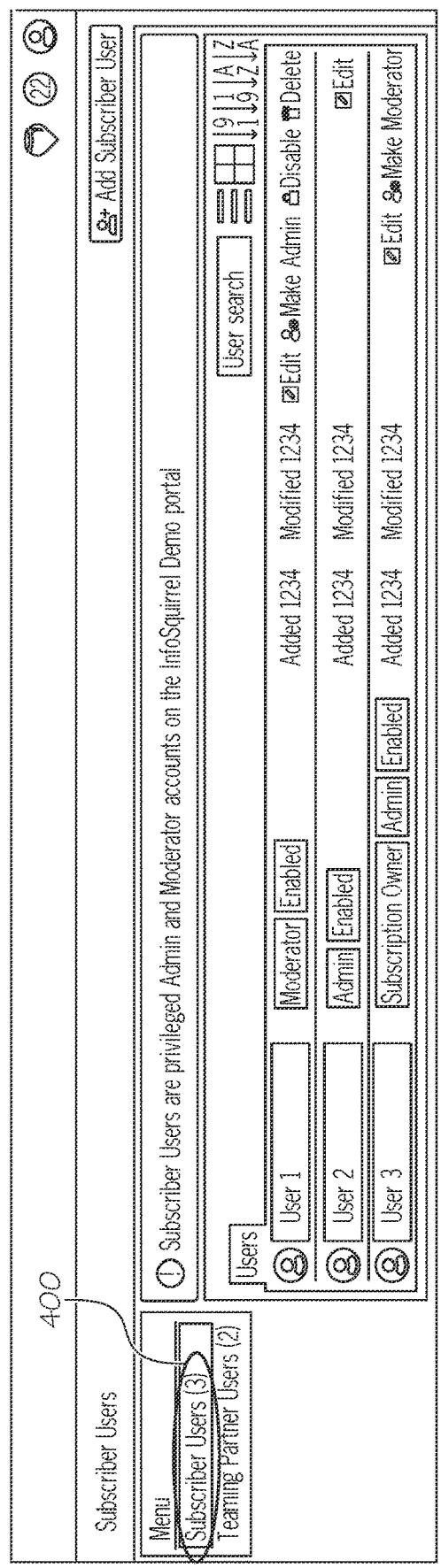
FIGS. 4 and 5 illustrate an example page listing members according to one or more embodiments described and illustrated herein.

FIG. 4 depicts a page that lists an example number of members that are designated as prime users 400. A subset of the prime users 400 may be designated as moderators. In embodiments moderators have limited access to various features included as part of the software. In contrast, prime users 400 that are admins or administrators have access to a full suite of products and services that are included as part of the software application of the present disclosure. It is noted that the designation of the prime users 400 may be altered from moderators to administrators and vice versa.

Figure 5:
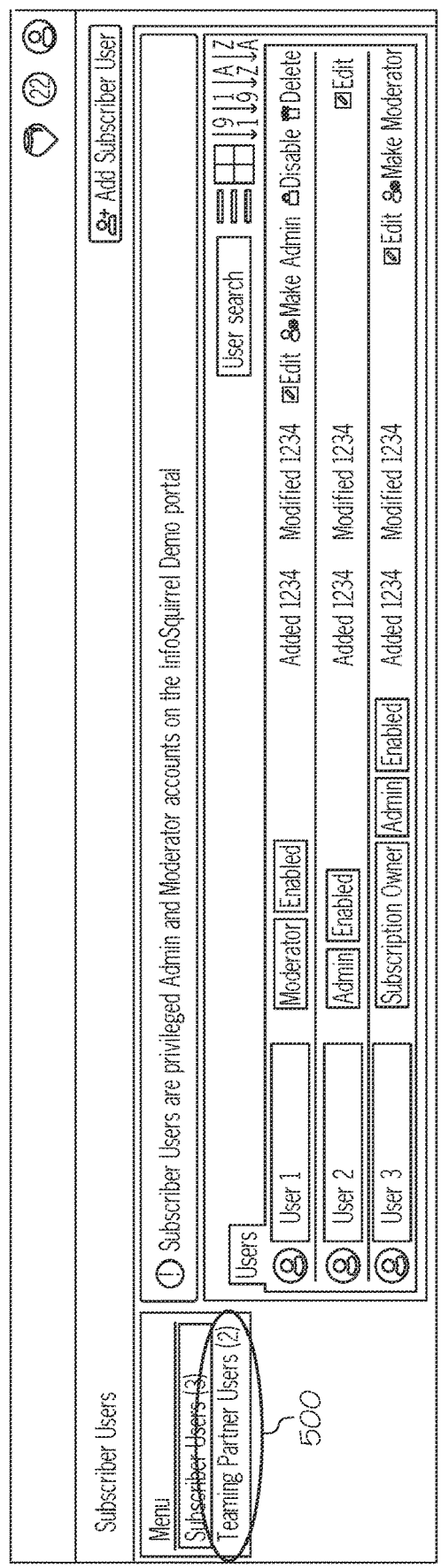

FIG. 5 depicts a page that lists an example number of members as "teaming partner users 500". Specifically, as illustrated in FIG. 5, a single teaming member account is provided. In embodiments, the teaming member may be associated with one or multiple companies simultaneously. In embodiments, multiple teaming members may be included, each of whom may be associated with one or more companies. In embodiments, a teaming member may be a company or individual with whom a prime member may be directly connected and with whom a prime member may have collaborated. Additionally, as stated above, a teaming member may be a company or individual with capabilities that satisfy a subset of the requirements of a solicitation and a prime member may be an individual or company that satisfies a different subset of the requirements of the solicitation. It is also noted that the capabilities of the prime member and the teaming member may overlap.

Figure 6:
FIGS. 6 and 7 illustrate a member profile page according to one or more embodiments described and illustrated herein.

FIG. 6 depicts a profile page associated with the single teaming member. As illustrated, the profile page may enable users to edit contact information associated with the teaming member, in addition to controlling various notifications that may transmitting to the teaming members via the software. For example, the notifications may relate to a newsletter, an invitation request related to a solicitation, and an approval or acceptance of the solicitation request. It is noted that the transmission and reception of these notifications may occur in real time. In embodiments, one or more of the notification transmission and reception process may be automated.

Figure 7:

FIG. 7 depicts a profile page associated with a prime user that may be designated as an administrator. As illustrated, in contrast to users that are designated as teaming members, users that are designated as administrators may have access to a variety of additional notifications, in additional to being able to control one or more permissions associated with various member designations. Moreover, members that are administrators may have the ability to change designations of other members.

Figure 8:
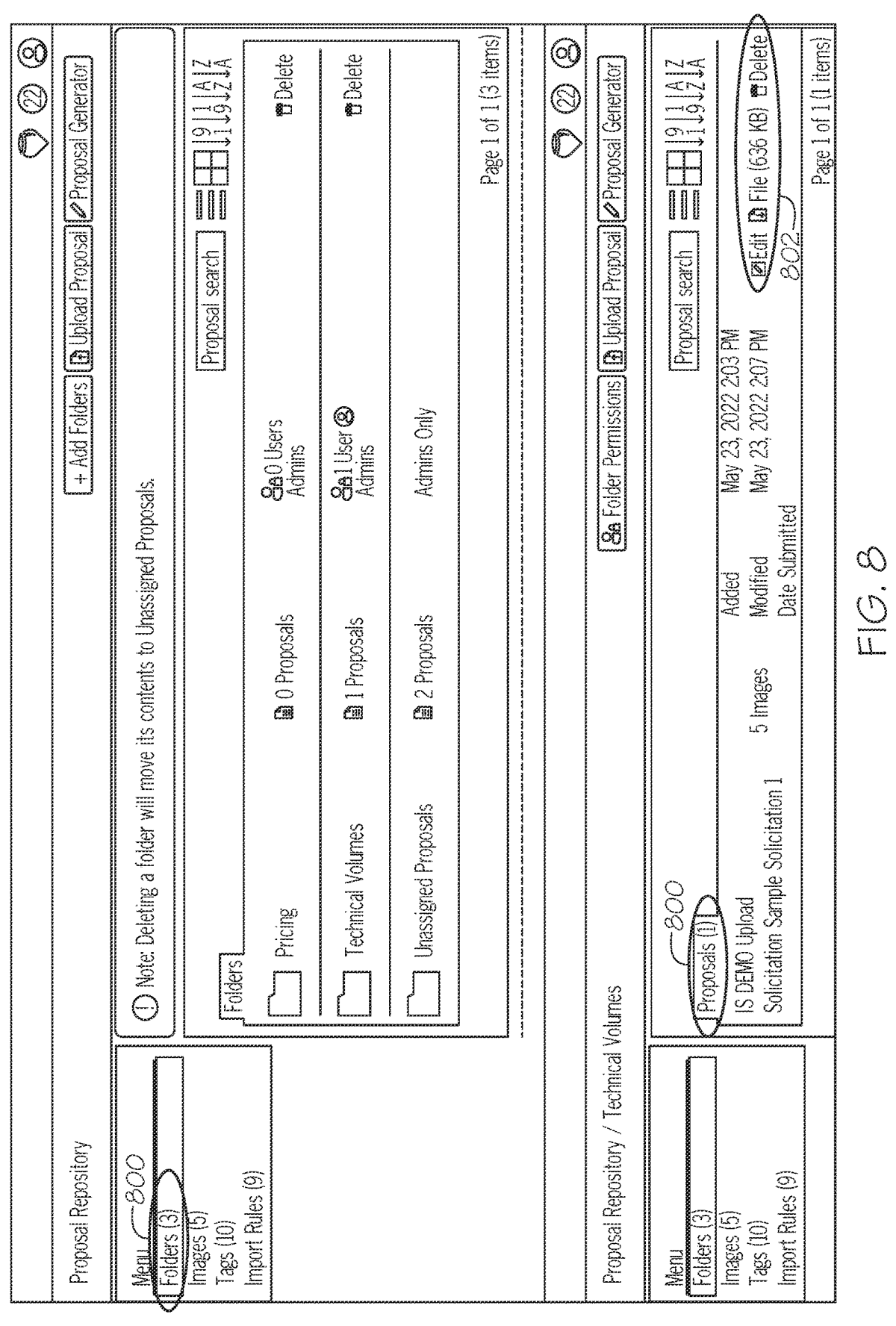

FIG. 8 depicts a document repository page of the software application, according to one or more embodiments described and illustrated herein. The documents shown by the document repository page may be any type of document. As a non-limiting example, the document repository page may display proposal documents, and thus is referred to herein as a proposal repository page and proposal repository. However, it should be understood that other types of documents may be stored and displayed. The proposal documents are in response to one or more solicitations or requests for proposals. The Proposal Repository organizes and stores previous and active proposals. As illustrated, the "Folders" tab 800 provides access to a folder hierarchy that is displayed. Users may navigate through the hierarchy to access a desired proposal. Proposals within a selected folder are displayed under tab 801 in the illustrated example. The proposals that are stored that may serve as templates. Additionally, interactions icons 802 may be positioned on the right portion of the document repository page. These icons, when selected, may enable a user to edit a proposal document, delete a proposal document, and so forth. It is noted that these proposal documents may be imported from various sources and locations, e.g., documents that are stored locally in hardware of a computing device, documents that are stored in a cloud, and so forth. In embodiments, the Menu section may include additional interactive icons such as "Categories", "Images", "Sections", and "Import Rules". Categories refer to classifications of various types of documents, while images may refer to images (and other digital content) that may be included within the documents. In embodiments, other interactive icons are also contemplated.

Figure 9:
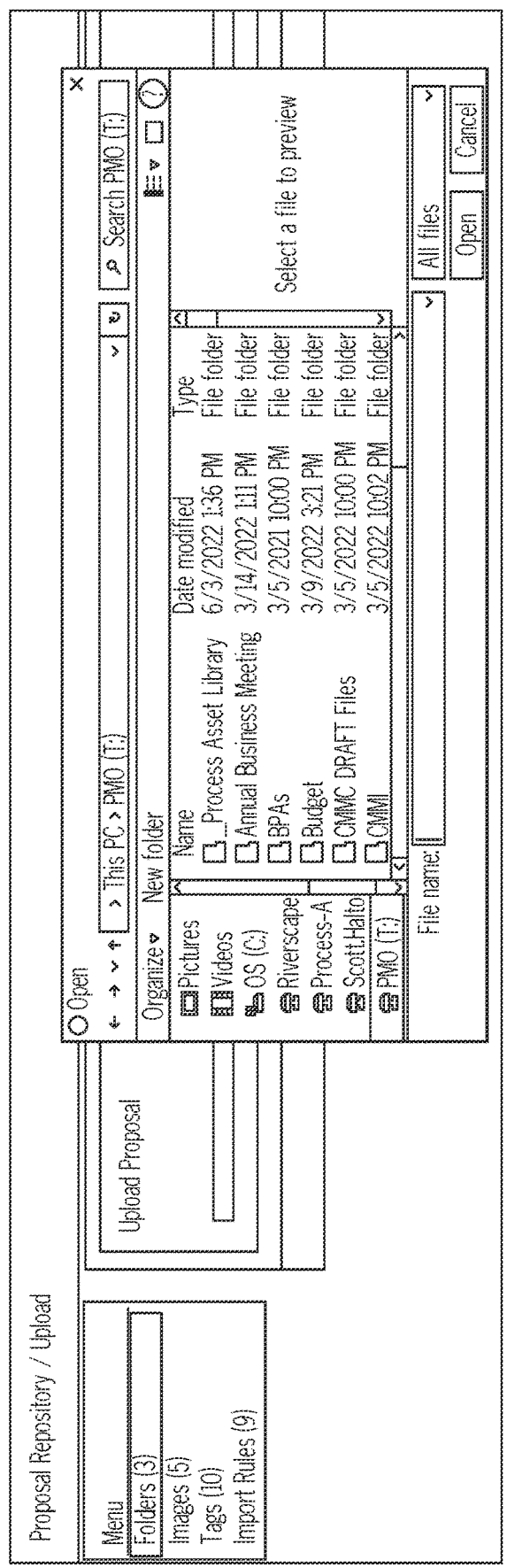
FIG. 9 illustrates an example proposal repository page providing for an upload of a proposal according to one or more embodiments described and illustrated herein.

FIG. 9 depicts an example user interaction in which a user may upload a proposal document that may be stored locally in a computing device that may be used to access the software. The proposal document that is uploaded may be stored in various formats. The proposal document may be saved locally in memory of a computing device through which the software application may be accessible. Alternatively, the document may be accessible via from one or more devices (e.g., servers) that are external to the computing device. Various types of documents (e.g., including but not limited to proposal documents) may be uploaded to the software. For example, these documents may be word documents, excel documents, jpg images, gif images, and so forth. Other document types and formats are also contemplated. Additionally, digital content in the form of video content, audio content, and so forth, may also be uploaded.

Figure 10:
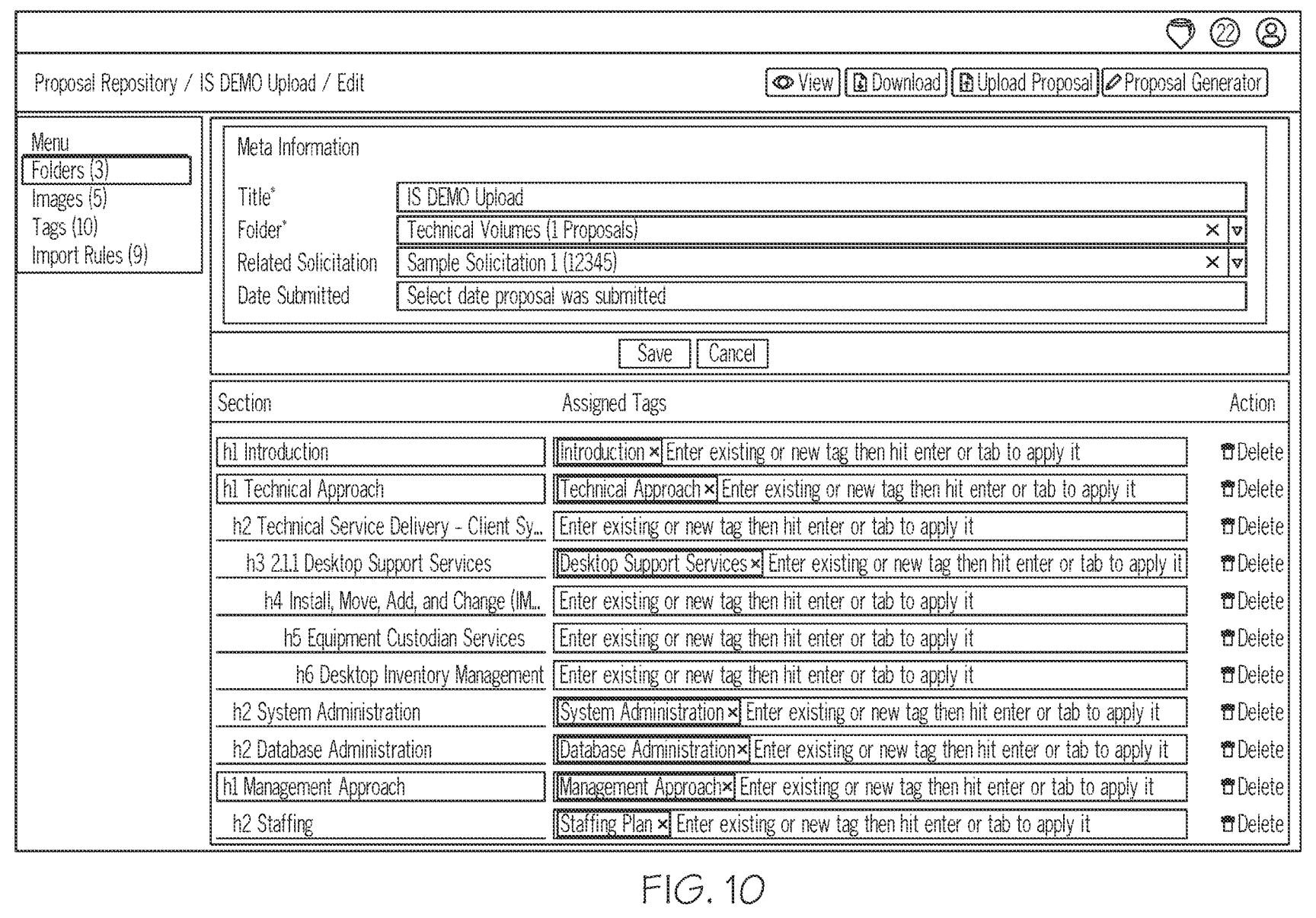

FIG. 10 depicts an example operation performed by the software application in response to a proposal document being uploaded as illustrated in FIG. 9, according to one or more embodiments described and illustrated herein. As illustrated in FIG. 10, the proposal document is parsed or partitioned according to various headings. For example, the document may include an "Introduction" heading, a "Management Plan" heading, a "Past Performance" heading, a "Quantity Control Plan" heading, and so forth. It is noted that the text of the headings may vary from document to document. The software operates to classify the headings according to various rules, as included in the "Section" portion. These rules may include a word recognition algorithm that operates such that a presence of a keyword or key phrase within the text of a heading may be utilized to automatically categorize the heading into a particular assigned section, namely a section that is associated with the keyword or key phrase.

Other factors may also be utilized to classify a heading of a document. For example, the location of the heading in the document (e.g., the first heading in the document). Other factors that may help identify a heading may include the heading being bolded and underlined, italicized, and so forth. A heading of a document that may not be identified based on a particular rule may be labeled with the use of a placeholder, e.g., "Heading 3", "Heading 4", "Heading 5", and so forth. In other embodiments, instead of a placeholder title, if a particular heading does not correspond to or may not be classified within a particular "Section", a new section under the "Section" may be created and this section may be labeled with the particular heading, verbatim. In embodiments, the software may provide the user with the ability to manually edit the newly created heading included in the "Section".

Rules may be established to automatically assign one or more tags to particular sections, as shown by the "Assigned Tags" portion. Tags may be automatically applied or manually applied by a user. For example, the section "2.1.1 Desktop Support Services" was automatically applied the tag "Desktop Support Services" by a rule. The user may add additional tags as desired.

Selection of an individual section causes the text of that section of the proposal to be displayed. FIG. 11 depicts an example selected section. In particular, the selected heading includes the term "Technical Service Delivery—Client Systems Technician Services," which causes the text to be shown in the bottom panel.

Figure 12:
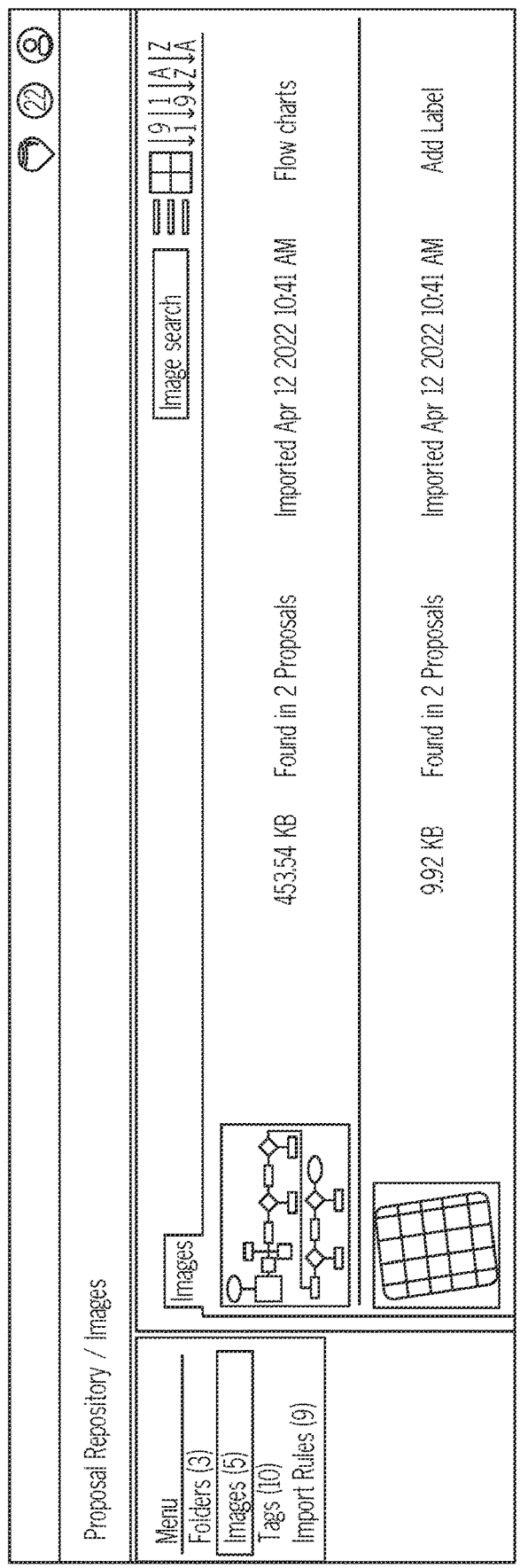
FIG. 12 illustrates an example image proposal repository page according to one or more embodiments described and illustrated herein.

The Proposal Repository may also allow users to search for images within the proposal documents stored in the repository. As shown in FIG. 12, selection of Images in the Menu section causes a plurality of images to be listed and displayed. These images are present in the proposal documents. The system may find and extract all images so that they may be displayed. The example user interface of FIG. 12 may be used to find which proposal documents the various images appear in. The user may click the Found in X Document text to be taken to the proposal document in which the image appears. The system provides the ability for users to search proposal documents for images.

Figure 13:
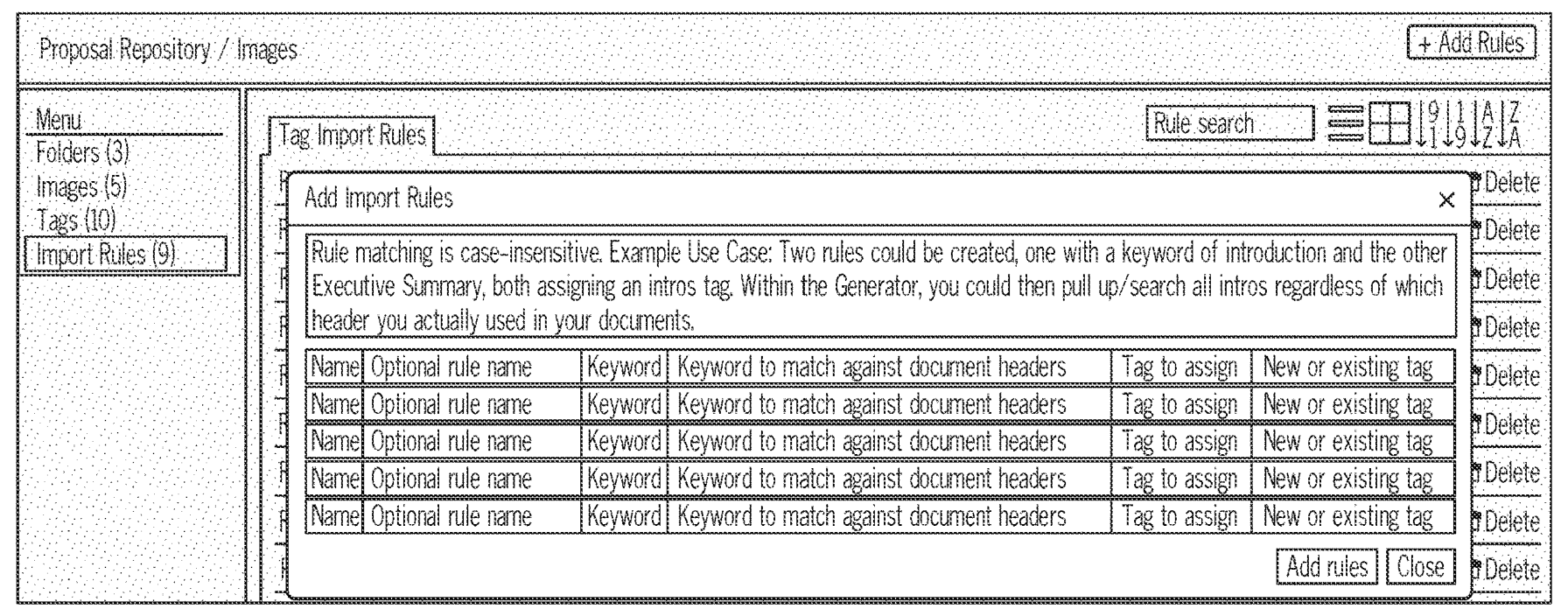

FIG. 13 depicts an example rule generating text box in which a plurality of text fields are displayed. A user may input various key terms and key phrases, based on which the headings within an electronic document may be classified. The key terms and key phrases may correspond to various rules. Each of the terms may also be weighted by a particular value such that certain phrases may be weighted heavier than other phrases. Additionally, in other embodiments, if a heading satisfies multiple rules (based on different key phrases), the rule that includes the longest key phrase may be utilized to classify the heading. More particularly, the user interface may allow the user to name a rule, include the keywords to search against, and the text of the tag to assign.

Figure 14:
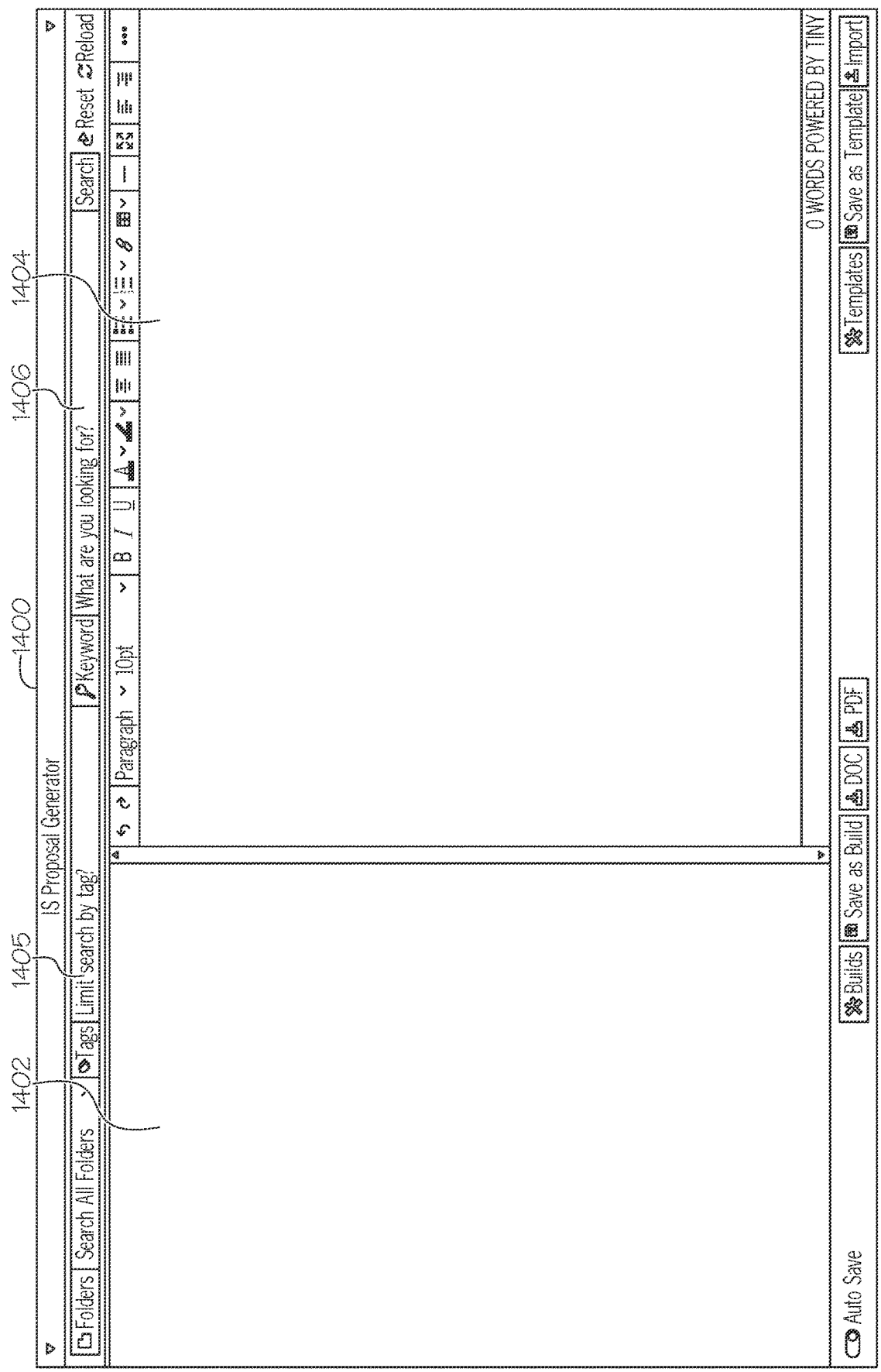
FIGS. 14-16 illustrate an example proposal generation page according to one or more embodiments described and illustrated herein.

FIG. 14 depicts an example proposal document generating user interface 1400 of the software application of the present disclosure, according to one or more embodiments described and illustrated herein. In embodiments, the user interface may include a keyword query text field 1406, a tag query text field 1405, a prior proposal section 1402 (i.e., a prior document section), and a word processing section 1404. The prior proposal section 1402 displays the text of one or more prior proposals for reference or incorporation into a current proposal that is being drafted in the word processing section 1404. When working on a particular section of a current proposal in the word processing section 1404, the user may search for sections of previous proposals by entering text into the tag query text field 1405. The user may also search for keywords by entering text into the keyword query text field 1406 to find previous proposals It is noted that the document generating user interface 1400 may include additional sections, each of which may have varying dimensions. In short, the document generating user interface 1400 may include other designs and dimensions as well.

Figure 15:
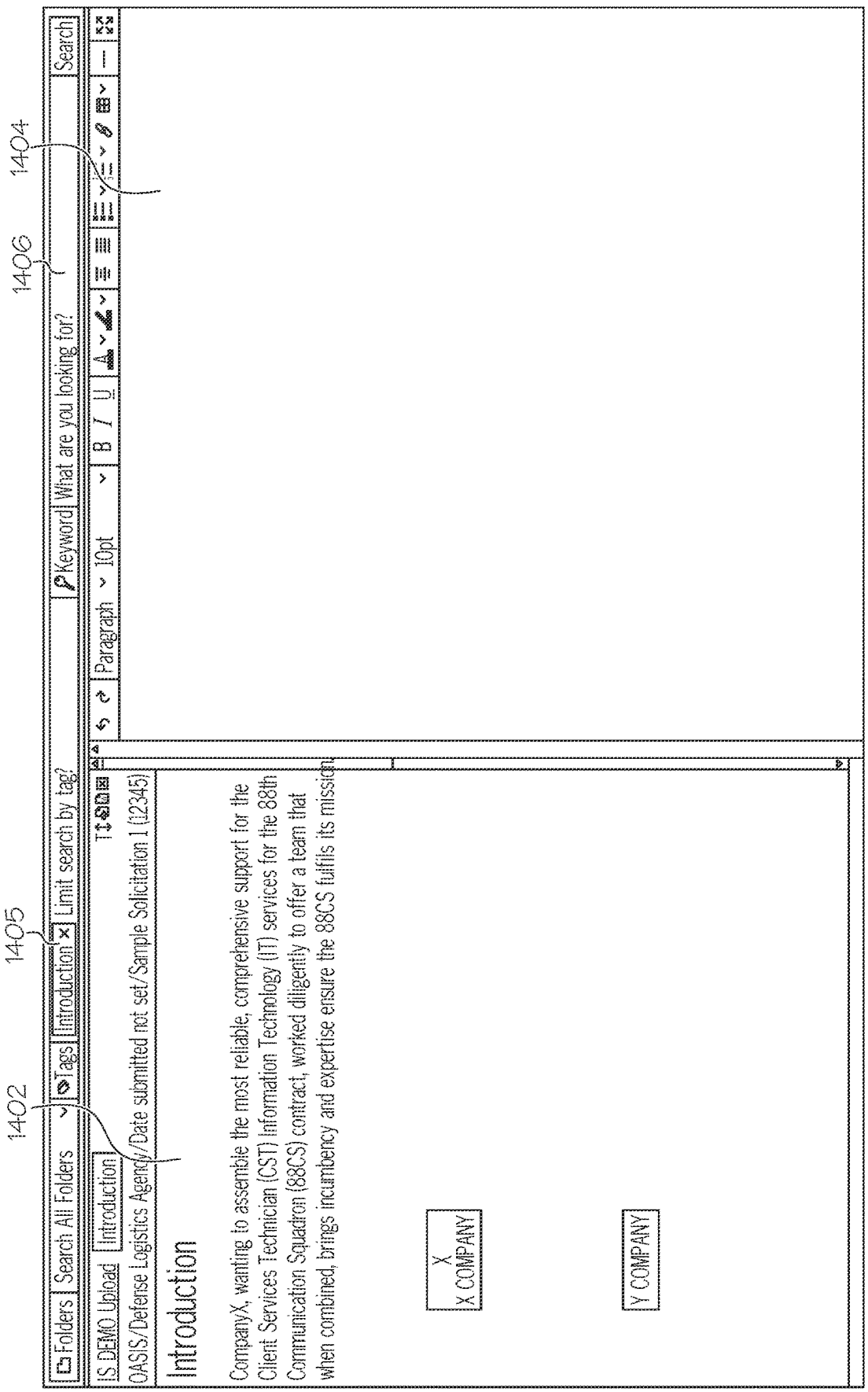

FIG. 15 depicts an example wherein a user has searched for the tag "Introduction" in the tag query text field 1405. As illustrated, upon input of the example tag "Introduction" in the tag query text field 1405, text from various electronic files and documents may be automatically displayed or available for selection. The user may scroll through many examples of text for the particular section (e.g., Introduction). The user may select one or more of these documents and a portion of document corresponding to the term "Introduction" may be automatically populated within the word processing section 1404. In this manner, a user may quickly build a proposal using previous examples. The user may go section-by-section to efficiently build a proposal.

Figure 16:
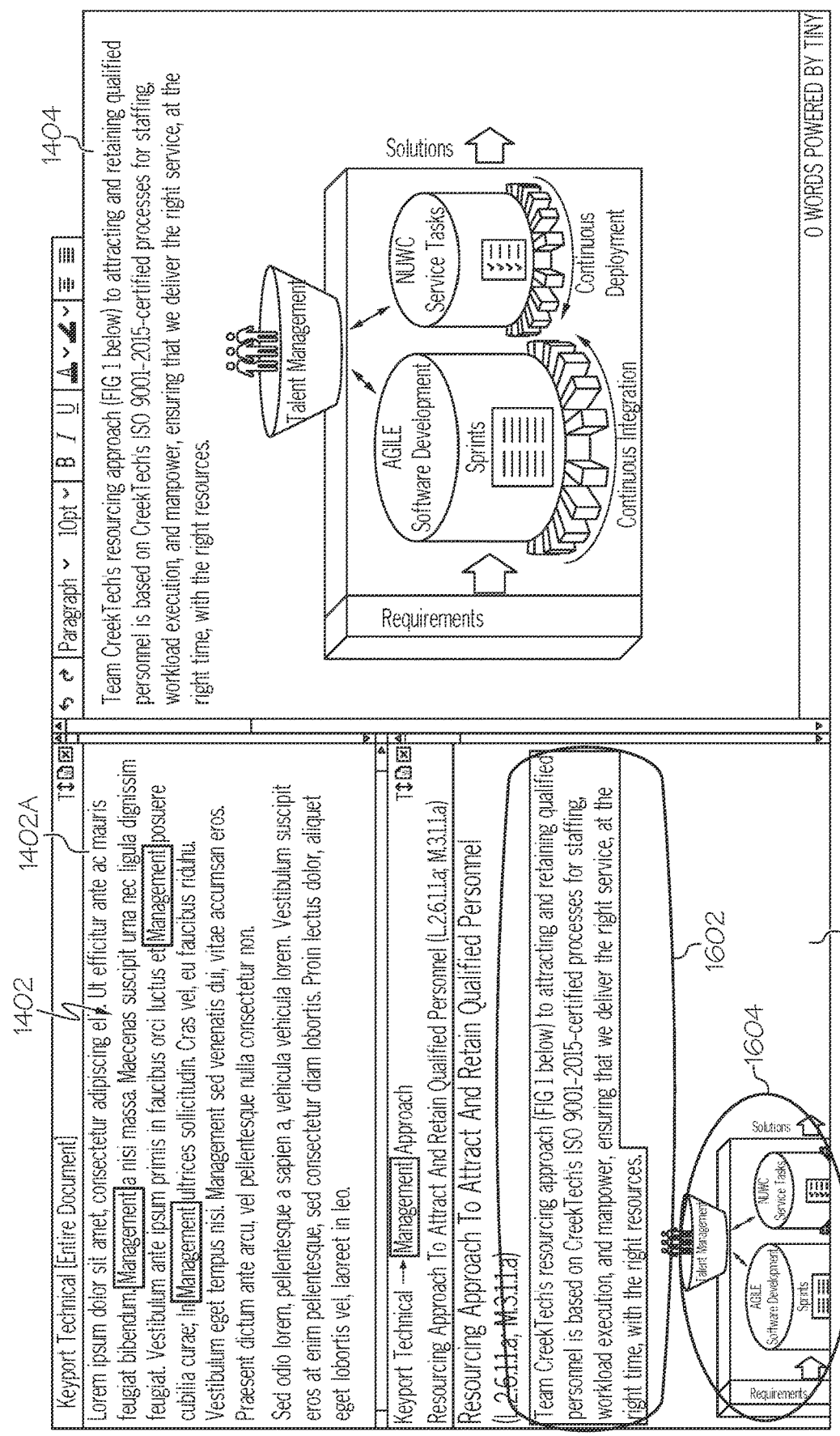

FIG. 16 depicts an example illustration of a user searching for a keyword "Management" (e.g., by using the keyword query text field 1406 of FIG. 14). In this example, the prior proposal section 1402 is split into two panes, a first pane 1402A shows the entire proposal document with the keyword highlighted and a second pane 1402 that shows a particular section of the proposal document matching the keyword "Management"

In the illustrated example, the user is generating a proposal document by copying subject matter from section 1402 and inputting it into section 1404. For example, the user may select text 1602 included in pane 1402B and drag and drop the text into the word processing section 1404. The user may also select an image 1604 that is included within the pane 1402B and include it in the current proposal, e.g., by another draft and drop operation. Other ways of including content within the word processing section 1404 are also contemplated. Additionally, in embodiments, the user may have the ability to save the generated document in the form of new templates. These new templates may be stored locally in the hardware of a computing device or may be accessible via one or more third party devices, e.g., servers. In embodiments the language included in the word processing section 1404 may be included as part of an editing environment or editor. The editor includes fonts, paragraph settings, and a variety of other features that are included within the regular text editors.

Figure 17:
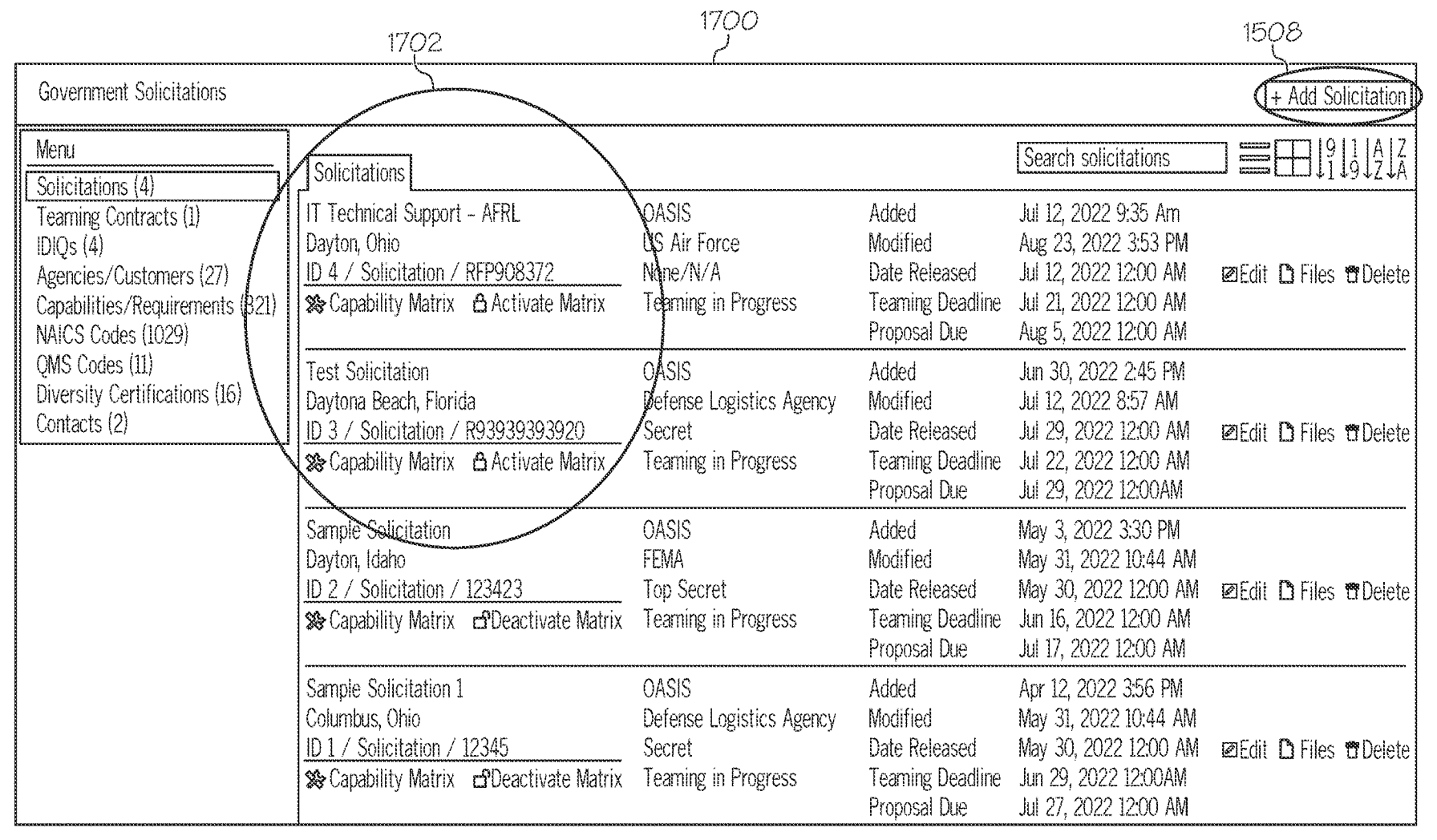

FIG. 17 depicts a solicitations page 1700 of the software application, according to one or more embodiments described and illustrated herein. For example, the solicitations page, as illustrated in FIG. 17, may include multiple user selectable interactive icons 1702 corresponding to various solicitations that have been imported into the system. Adjacent to these icons, the names of the entities that generated these solicitations may be included, in addition to options for editing and deleting these solicitations. The top right portion of the solicitations page 1700 may include a selectable interactive icon labeled "Add Solicitation". A user may select this interactive icon and input details regarding a solicitation.

FIG. 18 depicts an example page in which details regarding a new solicitation may be input, according to one or more embodiments described and illustrated herein. For example, the title of the solicitation, the status of the solicitation, the number, IDIQ, Agency, Required Clearance, and other such information relating to a new solicitation may be input. These details of the solicitation may be outlined in the solicitation or request for proposal provided by the requesting entity, such as a government agency.

FIG. 19 depicts an example page in which various capabilities and requirements associated with one or more solicitations may be listed. As illustrated, example requirements 1902 are listed, which may be "Artificial Intelligence", "Database Administration", "Education Services", "NAICS Codes", and so forth. A variety of other requirements are also contemplated.

Figure 20:
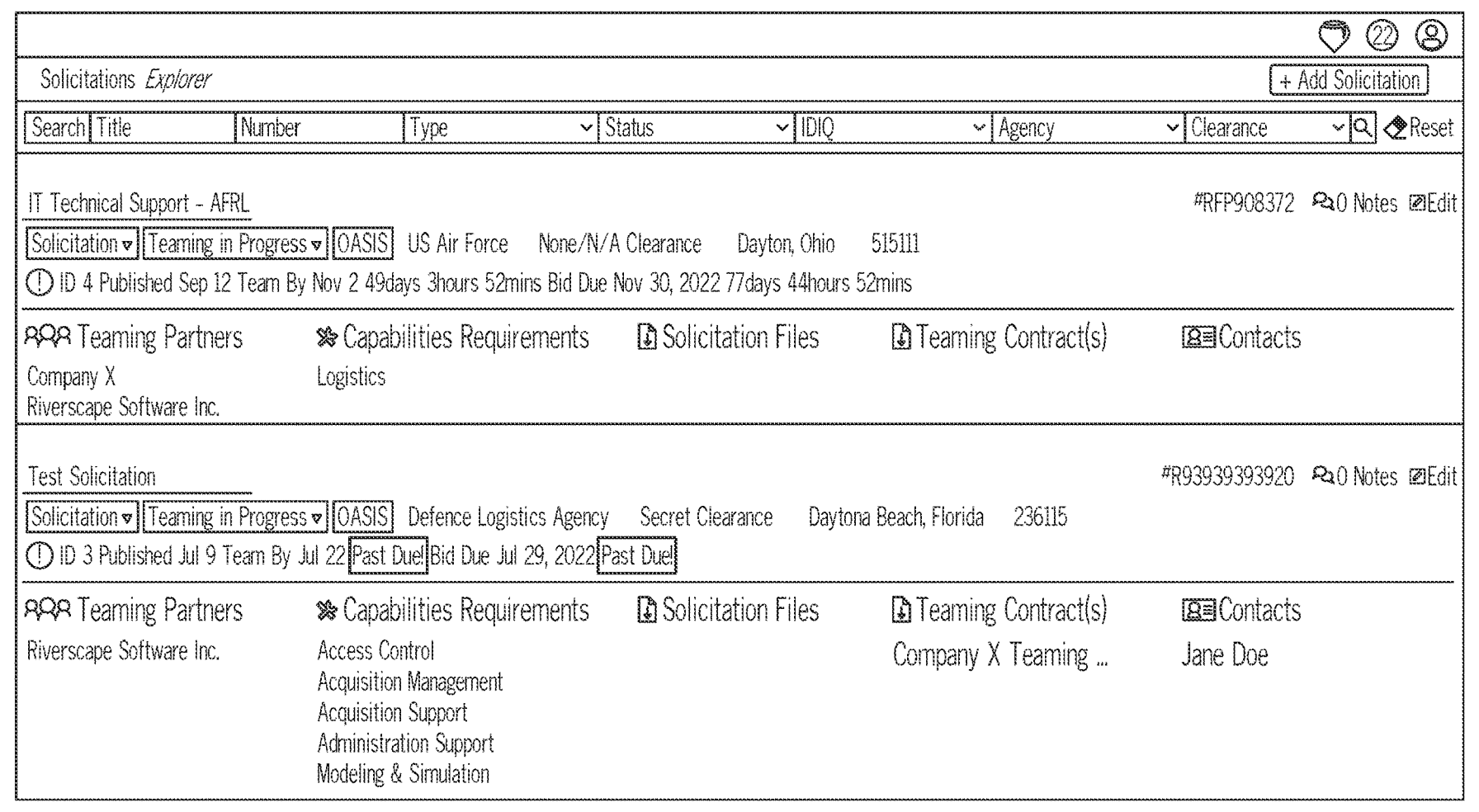

FIG. 20 depicts an example list of solicitations that are displayed when a user selects the interactive icon labeled "solicitations explorer". In embodiments, upon selection of the "solicitations explorer", one or more interactive icons associated with various solicitations may be listed. Underneath these icons, the various teaming partners currently associated with or who may be associated with the solicitation may be provided. Additionally, capability requirements, files, teaming contacts, and individuals that serve as contacts may be also be listed underneath the interactive icons. The teaming partners that are listed are companies that have capabilities that match the requirements of the solicitation. The list of capability requirements for the teaming partners may also be displayed. It is noted that each of the solicitations may be in four possible states: teaming in progress, writing proposal, bid submitted, or not bidding. In embodiments, various details regarding the solicitations may be included, e.g., the date of publication of the solicitation, a teaming deadline that a prime sets for a particular solicitation, and the due date for the bid. In embodiments, the example list of solicitations and various associated details may be displayed to a particular company or subscriber that is designated as a prime member, but may not be available for a team member with whom the prime member is associated or partnered.

Figure 21:
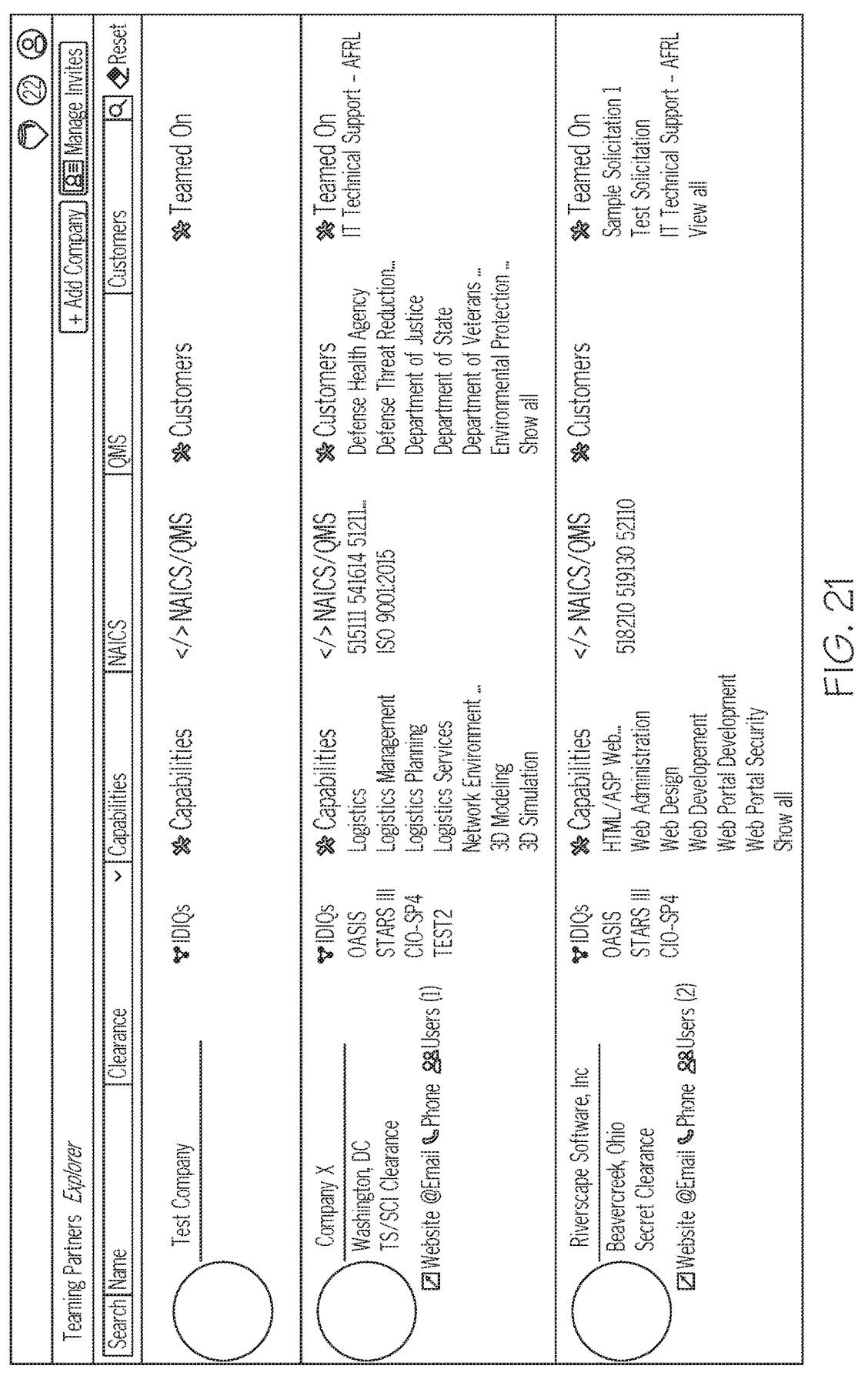

FIG. 21 depicts a digital page that lists team members that are displayed when a user selects an interactive icon labeled "team members" explorer. In embodiments, upon selection of the team members explorer, a list of team members with whom a particular company or subscriber may partner is displayed. As illustrated in FIG. 21, a directory of teaming members are listed. Various details regarding each of the teaming members may be provided, such as IDIQs, Capabilities, NAICS/QMS codes, a list of customers associated with each listed team member, and the project or solicitation on which a company or subscriber may currently be partnered.

FIG. 22 depicts an example solicitation details page that is displayed when a user selects an interactive icon associated with an individual solicitation. As illustrated, the example solicitation details page may list current teaming members, capability requirements, solicitation files, teaming contracts, government contracts, pending requests, and pending invitees. The example solicitation details page may also include a notes section in which a prime member may include various comments, e.g., by selecting the "add notes" interactive icon.

Figure 23:
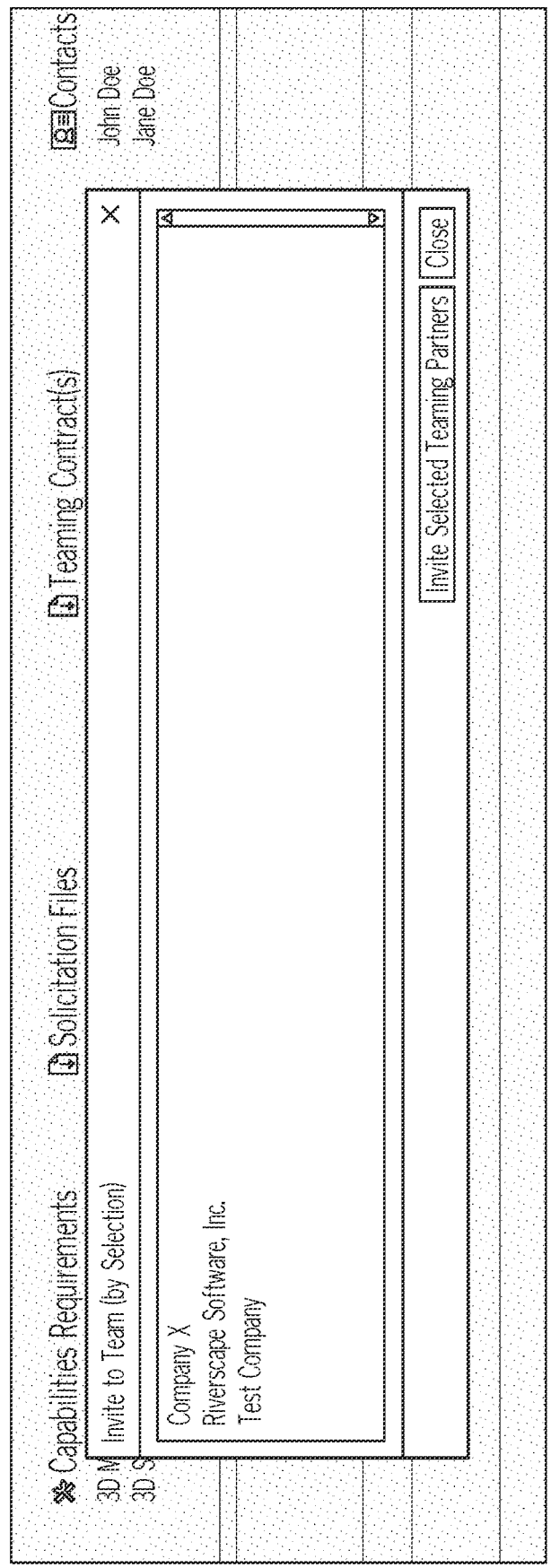
FIGS. 23 and 24 illustrate example pages for inviting team members according to one or more embodiments described and illustrated herein.
Figure 24:
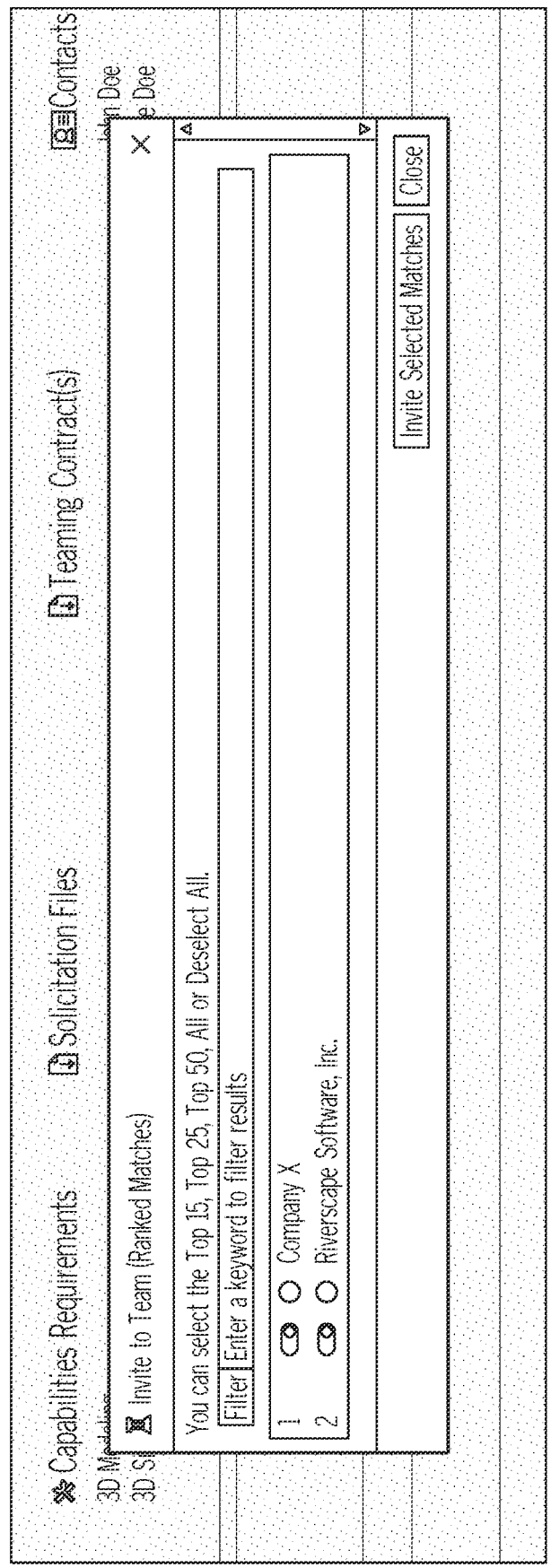

FIG. 23 depicts an example feature that enables a user to send a request to join a solicitation. For example, a user that is associated with a company may choose a company that is designated as a prime member from a list and send a request to join or partner with a company related to a particular solicitation. As such, a user that has not received a solicitation may initiate a request to join. The prime member that receives the request may have the ability to approve or decline the request. In embodiments, multiple team members may be invited. FIG. 24 depicts an example automatic teaming member matching feature of the present disclosure, according to one or more embodiments described and illustrated herein. In embodiments, a user may initiate an "invitation by matching" feature, e.g., by selecting an interactive icon labeled "invitation by matching". In response, the software application may identify a list of companies that the software deems as potential matches associated with a solicitation. For example, the software application will scan or analyze the subject matter of a particular solicitation, the list of all of the companies included in the software that are directly connected to a particular member (e.g., a prime member), and display a set of potential matches. More particularly, the capabilities of the various members are compared against the requirements of the solicitation to determine the best matches. In some embodiments, a combination of one or more artificial intelligence and machine learning based techniques may be utilized to analyze the requirements enumerated in the solicitations. However, embodiments are not limited by artificial intelligence and machine learning methods. Other algorithm methods may be utilized. The analyzed requirements may be cross referenced with capabilities of various potential teaming members. The analysis may include matching keywords, images, and other subject matter included in the solicitation with keywords, images, and other subject matter that describes the capabilities of the potential teaming members. It is noted that techniques that are independent of artificial intelligence and machine learning may also be utilized to match or cross references the requirements of a solicitation with various capabilities associated with a variety of potential teaming members.

Thereafter, the identified subset of companies may be ranked according to which companies best match the capabilities and requirements of a solicitation. In embodiments, a top ten list of companies may be listed as potential matches. In embodiments, as illustrated in FIG. 24, all companies that are possible matches may be listed upon selection of, e.g., an "Invite Selected Matches" interactive icon. In embodiments, upon selection of "Invite Selected Matches", a particular user may be provided with a list of companies that are part of another network, e.g., networks that operate independent of the software of the present disclosure. In this way, prime members may be connected to or made aware of potential teaming members that are not part of their immediate network. In embodiments, the software as described in the present disclosure may enable various companies to input their respective capabilities as part of a "capability matrix". Each of the capabilities included in the capability matrix may be weighted and matched with one or more requirements of a solicitation.

Figure 25:
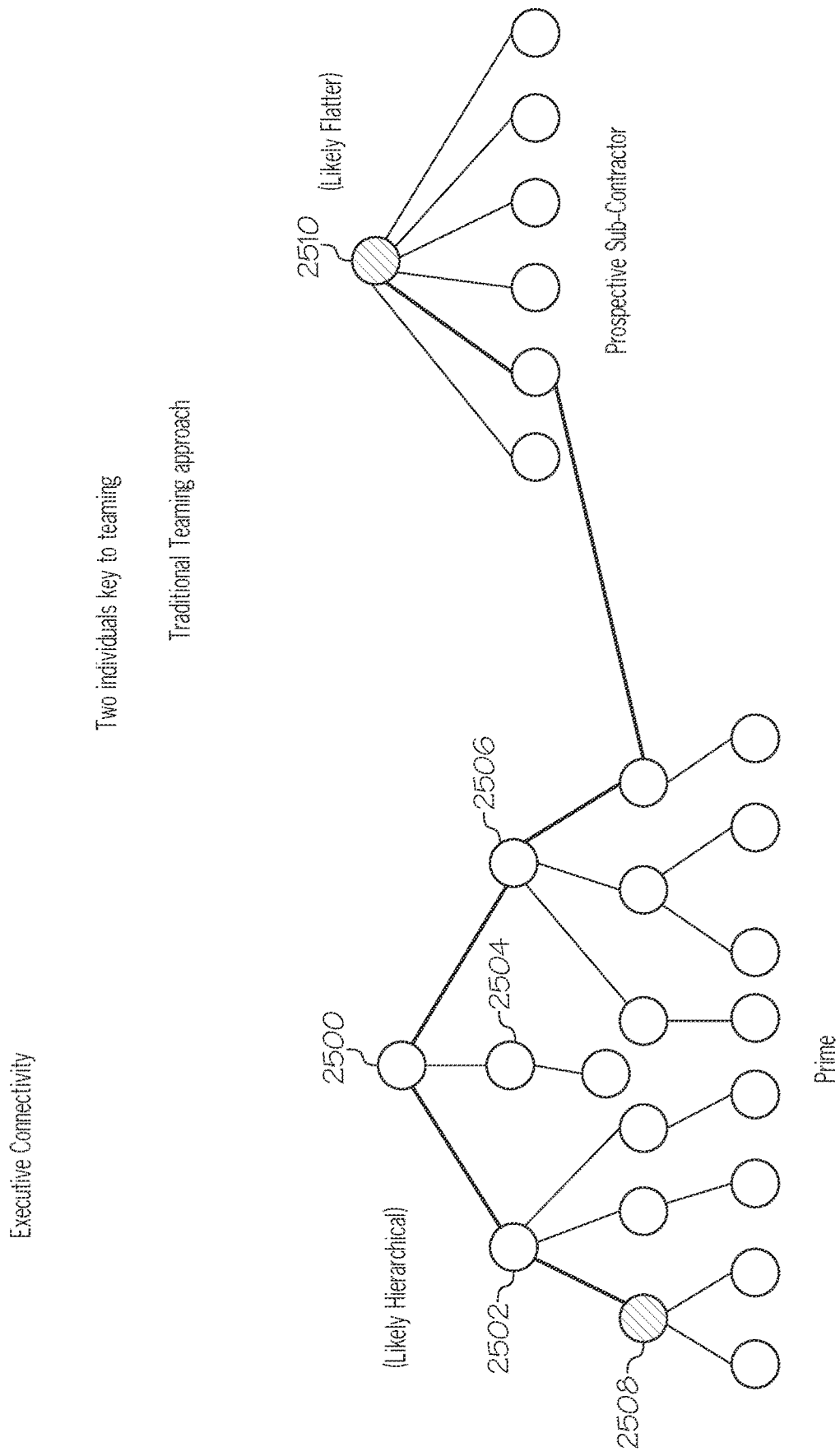
FIG. 25 illustrates a diagram of executive connectivity.

FIG. 25 depicts an example connection configuration or diagram of various users that may utilize the software application of the present disclosure, according to one or more embodiments described and illustrated herein. For example, a particular user that may be designated as a prime member, e.g., a prime member 2500, may be directly connected to a variety of additional members (e.g., members 2502, 2504, 2506), each of whom may be connected to respective additional members. The connections of the prime member 2500 may correspond to a substantially hierarchical configuration. In contrast, connections between an example set of non-prime members, e.g., subcontractors, will be less hierarchical. Specifically, as illustrated in FIG. 25, the example subcontractor 2510 has a plurality of direct connections. In other words, none of the connections of the example subcontractor 2510 have one or more intermediate connections.

In embodiments, a subset of the members of a team may be considered key members of the team. For example, member 2508 and example subcontractor 2510 may be deemed key members. In embodiments, the software application as described herein may enable connections between these key members in an efficient manner. In short, members positioned at various levels in a hierarchy may be efficiently connected, and as such, the software facilitates connections in a manner that disintermediates intermediaries. In other words, the software application has features that increase the centrality of a member within a hierarchy, i.e., it enables sub-contracts to identify viable prime contractors, and prime contracts to identify viable sub-contractors within the network of users.

Figure 26:
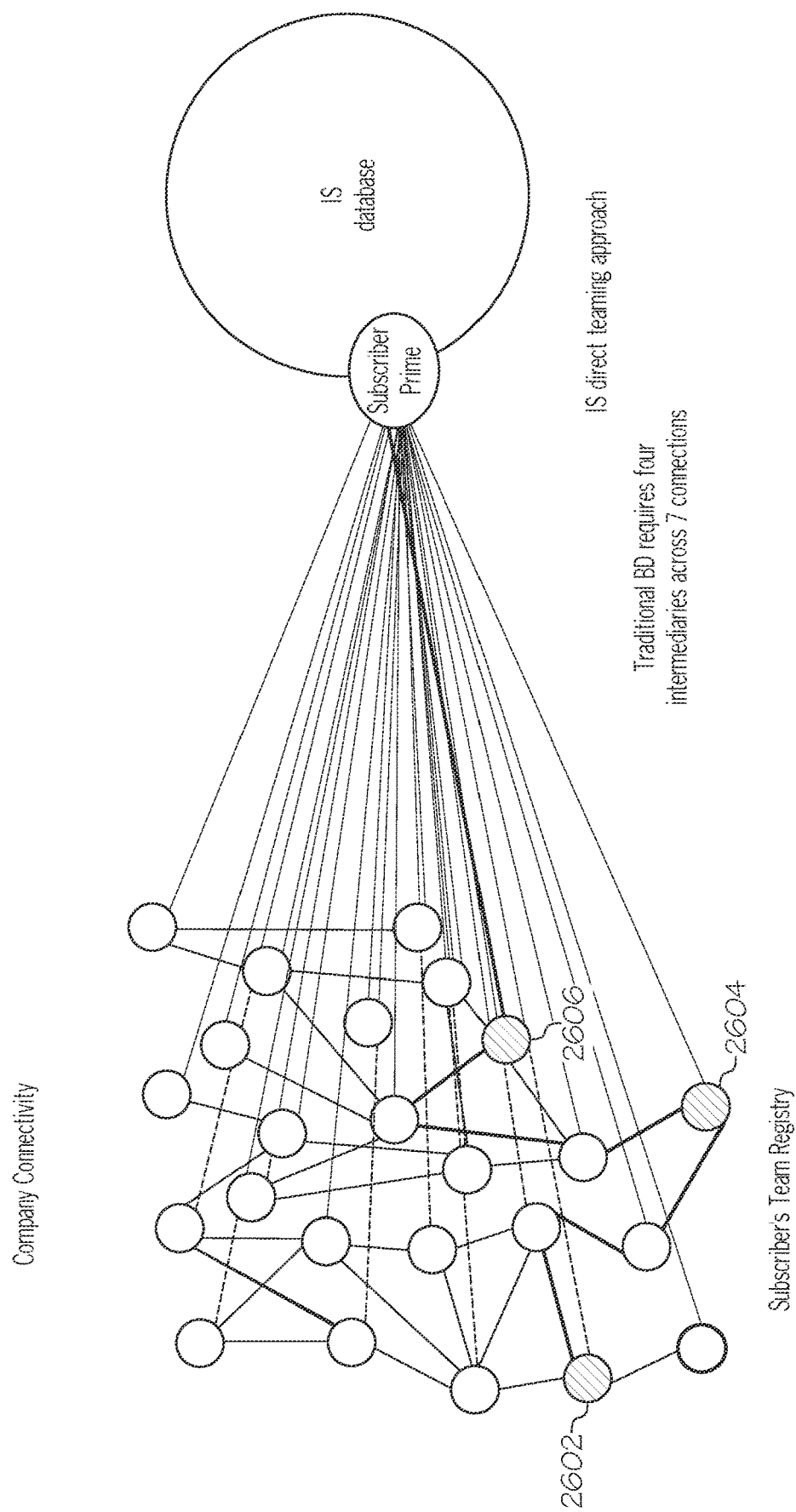
FIG. 26 illustrates a diagram of company connectivity.

FIG. 26 depicts an example connection configuration or diagram of various companies that may utilize the software application of the present disclosure, according to one or more embodiments described and illustrated herein. As illustrated, a number of companies (e.g., corresponding to the small circles) may be included as part of a particular subscriber's team registry. Each of these firms or companies (indicated by small circles) may include their own set of existing connections.

Conventionally, based on analyzing the capabilities of all of these companies relative to the requirements enumerated in a particular solicitation, e.g., via manual analysis, a set of three matches or connections that suit the capabilities of a particular solicitation may be identified. Conventionally, the three matching companies may be identified as a result of multiple conversations between a particular prime member included as part of a company and one or more employees within these three matching companies, in addition to analysis of the capabilities and requirements of each of these companies, which may also be performed manually. A set of three strongest matches may correspond to example companies 2602, 2604, 2606.

In contrast, the software application of the present disclosure facilitates direct connections between a particular subscriber and a variety of companies, as indicated by the thin lines emerging from the data base to each of the smaller circles, which correspond to various companies. As such, due to the direct connections, employees within companies do not have to have multiple conversations with a particular member who may be connected to another member or company that may be a strong match for a particular solicitation. In this way, as with executives, the software application enables disintermediating intermediaries with respect to various companies. Moreover, the direct connections as illustrated in FIG. 26 enables a company to form direct connections with high performing teaming partners that may be located on edges of a network of a particular company.

Figure 27:
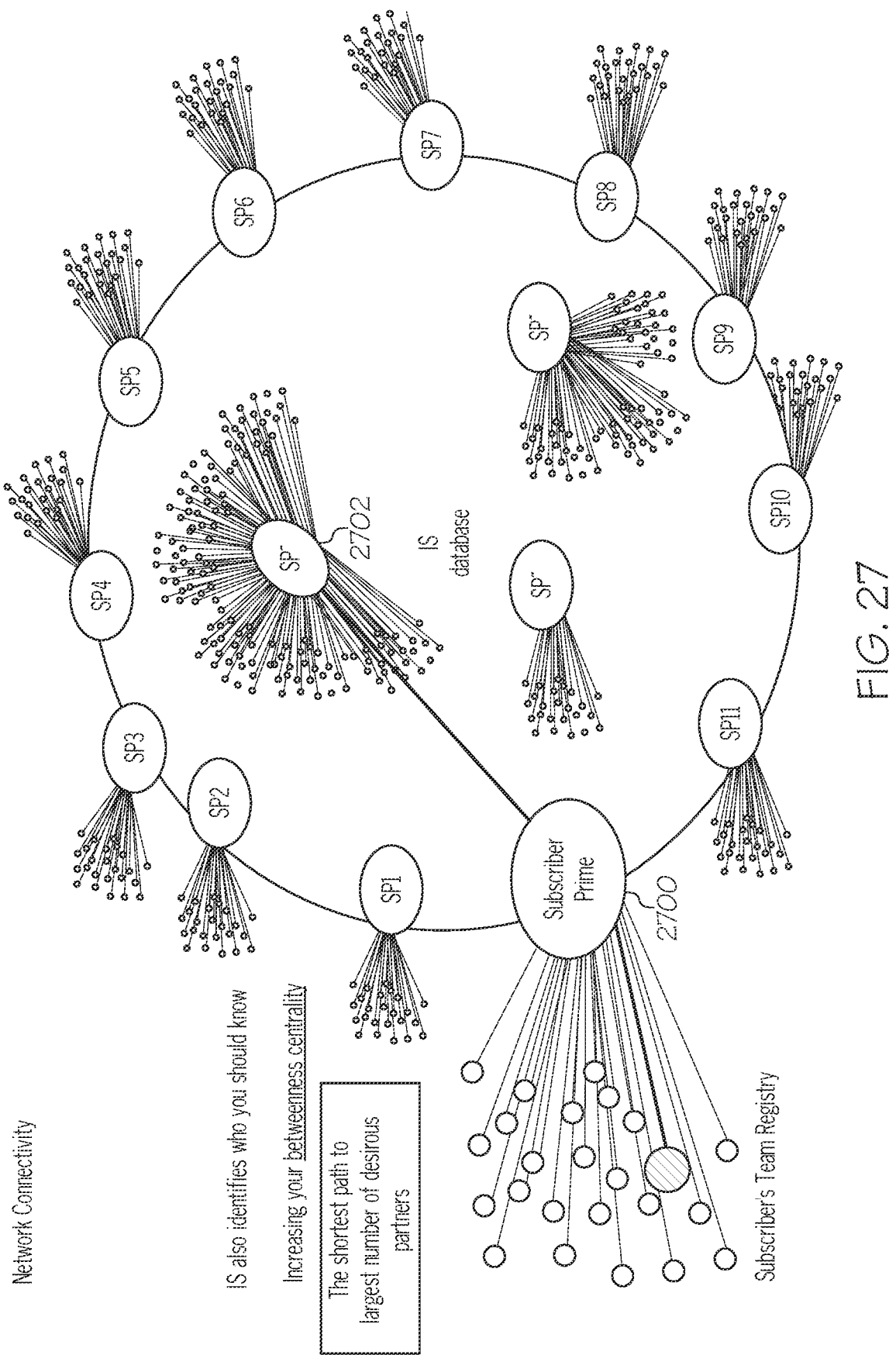
FIG. 27 illustrates a diagram of network connectivity.

FIG. 27 depicts an example connection configuration or diagram of networks that may utilize the software application of the present disclosure, according to one or more embodiments described and illustrated herein. As illustrated, the software application of the present disclosure may analyze direct connections, in addition to identifying one or more companies that a particular subscriber company should know. For example, the example subscriber prime member 2700 may be informed that this member (e.g., a company) should know and be made aware of another example subscriber prime 2702. In this way, the "centrality" of a particular subscriber company may be increased. The "centrality" may be associated with or define a shortest path between a particular subscriber prime and the largest number of desirous partners with whom a particular subscriber company may be connected.

Figure 28:
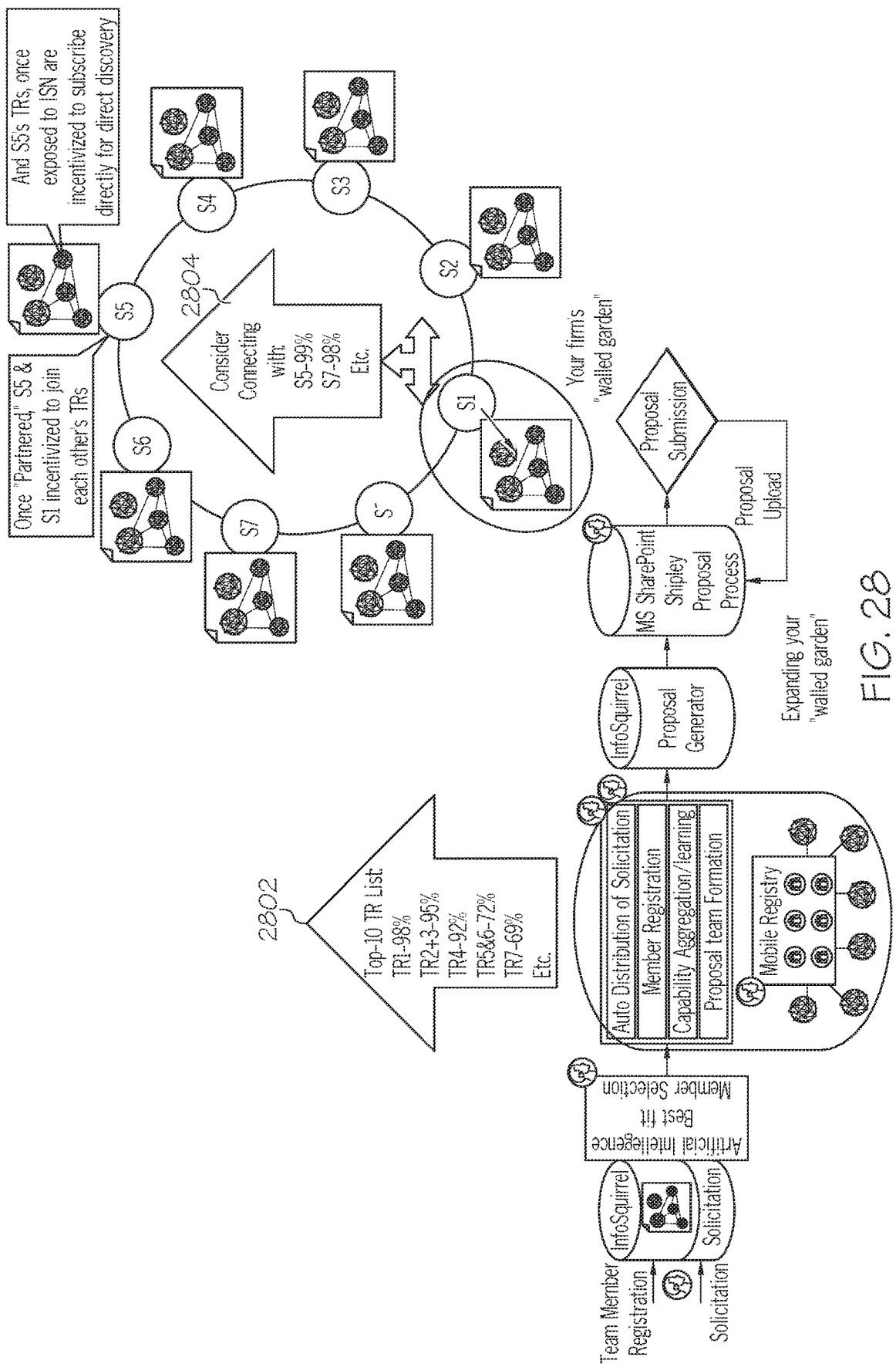
FIG. 28 illustrates an example process flow of a submission of a proposal according to one or more embodiments described and illustrated herein.

FIG. 28 depicts an example process flow of a submission of a proposal using the software application of the present disclosure, according to one or more embodiments described and illustrated herein. In embodiments, a solicitation may initially be received by a particular company, e.g., a prime member company. In response, the software application of the present disclosure may perform analysis of the solicitation, e.g., the requirements outlined in the solicitation, and match these requirements with the capabilities of one or more companies with whom the prime member company is connected. As a result, in embodiments, a list of ten matching companies may be identified, as indicated by the matching company list 2802. It is noted that one or more machine learning techniques may be utilized to identify the list of matching companies. In embodiments, the companies listed in the matching company list 2802 may be ranked according to a particular order such that the company ranked at the top of the list may be the best suited company to satisfy the requirements listed in the solicitation, while the companies listed second and third may be the next best suited companies for satisfying the requirements listed in the solicitation. In embodiments, the matching company list 2802 may first provide a list of companies, each with another member that is best suited to satisfy the requirements listed in a solicitation.

In addition, the software application may simultaneously perform an additional analysis within the network, which provides the prime and/or sub-contractor member with a vast number of additional companies with whom the prime member is not connected, e.g., additional companies with whom the prime member should be connected but may not be currently connected. A subset of these additional companies may have the capabilities that satisfy the requirements listed in the solicitation. The subset 2804 may also be ranked in a manner that is similar to ranking of the matching company list 2802. In embodiments, the exposure to the additional companies may be such that an invitation may be sent directly from the prime member to these additional companies. However, it is noted that these additional companies do not have complete access to all of the companies with whom the prime member is connected, and the prime member does not have complete access to all of the connections of these additional companies. However, these additional companies may be prompted to connect with the prime member and vice-versa.

Figure 29:
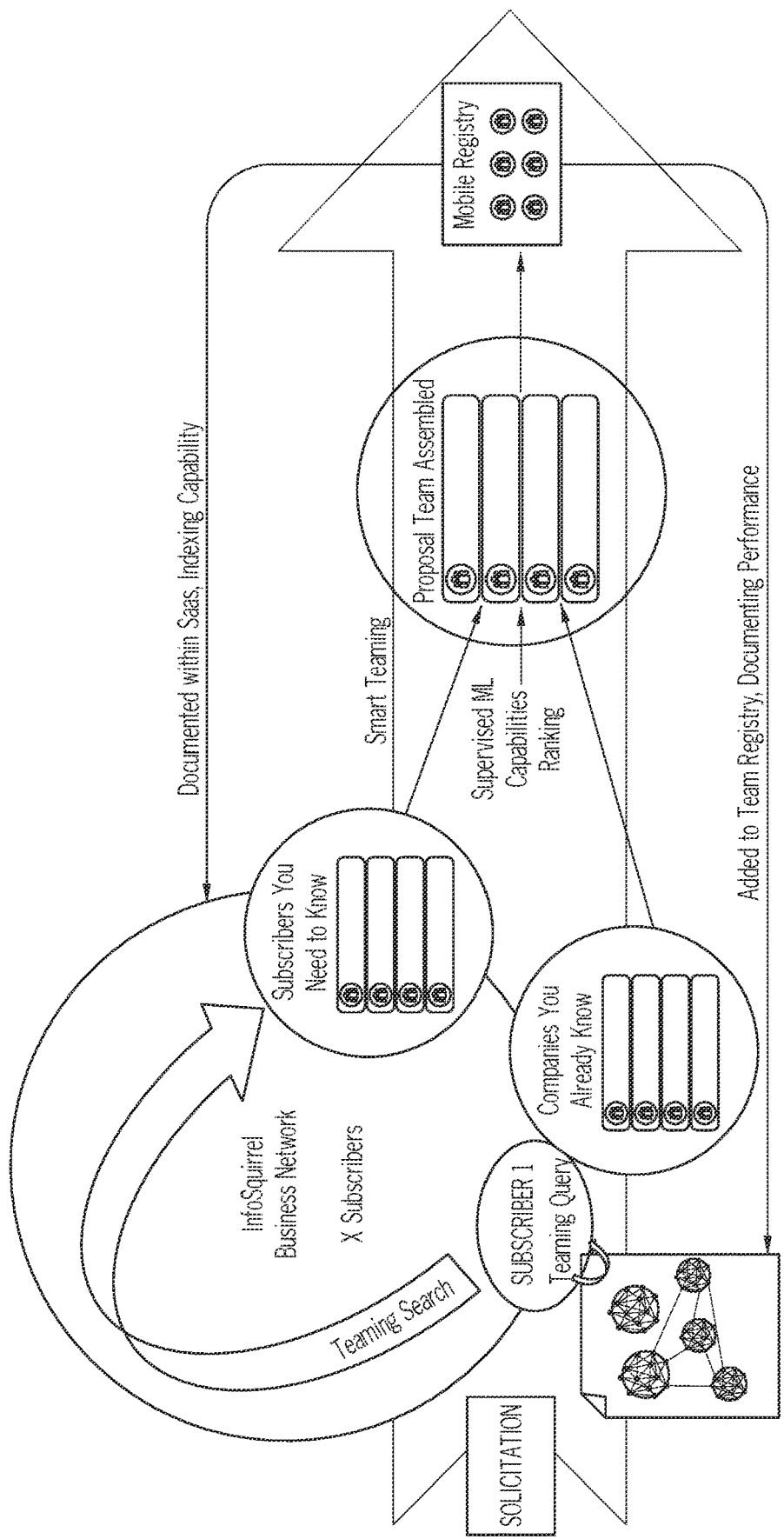
FIG. 29 illustrates another example process flow of a submission of a proposal according to one or more embodiments described and illustrated herein.

FIG. 29 depicts a more concise version of the process flow diagram illustrated in FIG. 28 and described above. It is noted that the process flow starts with receipt of a solicitation. In response, a list of potential teaming members in the team registry is analyzed relative to the requirements enumerated in a solicitation and a list of potential matching companies are identified, e.g., "Proposal Team Assembled". It is noted that the proposed team may be identified and ranked using one or more algorithmic techniques (e.g., machine learning techniques). Additionally, a network associated with the software application of the present disclosure may be accessed and companies with whom a prime member or prime member company should be connected are identified. These companies may be identified based on a likelihood that they would satisfy the requirements enumerated in the solicitation. It is further noted that these companies may be ranked according to their suitability for satisfying the requirements listed in the solicitation. It is noted that multiple steps in the process flows illustrated in FIGS. 28 and 29 may be automated.

Figure 30:
FIG. 30 illustrates an example capability matrix builder page according to one or more embodiments described and illustrated herein.

FIG. 30 depicts an example capability matrix builder page of a non-limiting example of the software application of the present disclosure, according to one or more embodiments described and illustrated herein. As illustrated, the page includes a plurality of user selectable icons such as "Add Capability Group", "Add Skill Requirement", and so forth, and a plurality of specific skills and capability icons such as, e.g., "Information Technology", "Web Development", and "Database Administration". In embodiments, as further illustrated in FIG. 33 and described in greater detail below, the capabilities and skills associated with a solicitation may be input into a variety of text fields. Members may use the matrix builder page to add, remove or edit their capabilities that will be matched against requirements of solicitations.

FIG. 31 depicts an example solicitations page of a non-limiting example of the software application. As illustrated, the example solicitations page includes a "sample solicitation" with various details associated with the solicitation, such as, e.g., the party that drafted and requested the solicitation, the date on which the solicitation was added, modified, released, and so forth, and the proposal due date. Additionally, as shown, FIG. 31 includes various user selectable icons such as, e.g., Solicitations, Teaming Contracts, Capabilities/Requirements, and so forth. Upon selection of the capabilities/requirements, a number of capabilities and requirements specific to a solicitation may be input by, e.g., a prime member. In embodiments, a capability matrix may be activated by a user selecting an "Activate Matrix" icon which may be positioned underneath a title or label associated with a solicitation, e.g., underneath "Sample Solicitation".

Figure 32:
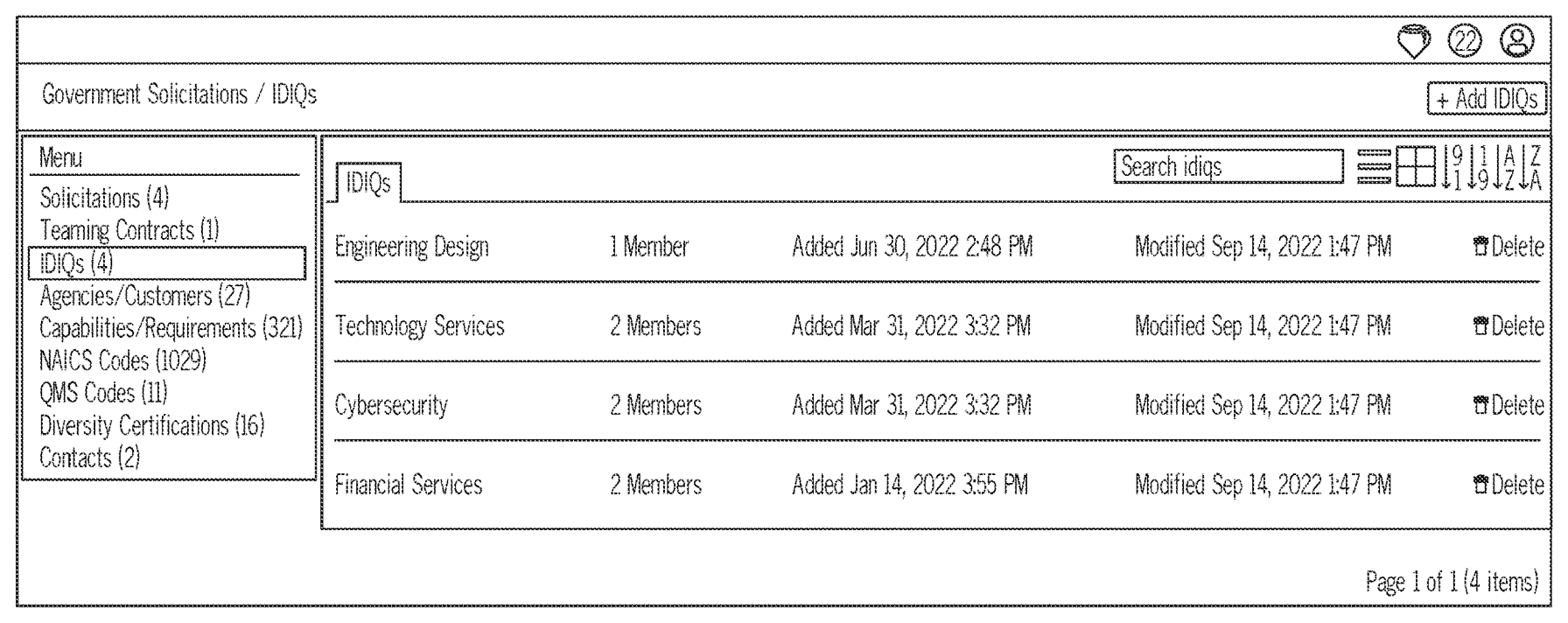

FIG. 32 depicts an example IDIQ page of a non-limiting example of the software application of the present disclosure, according to one or more embodiments described and illustrated herein. It is noted that IDIQ stands for "Indefinite Delivery, Indefinite Quantity", and refers to contracts that provide for an indefinite quantity of services for a fixed time frame. As illustrated in FIG. 32, selection of the interactive icon labeled "IDIQ" may provide a list of member companies, including "Creek Technologies Company", "Lions Technology Services", and "Riverscape Software, Inc."

Figure 33:
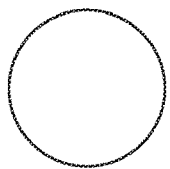

FIG. 33 depicts a page including various text fields into which "NAICS Codes" data and capabilities may be input, according to one or more embodiments described and illustrated herein. As shown, a prime member may input a list of capabilities within the capabilities text field that the prime member would like a potential teaming member to possess. For example, based on a review of one or more solicitations, the prime member may input certain capabilities requirements or skillsets such as, e.g., "Education Services", "Information Technology", "Help Desk Support", and so forth. Other examples of capability requirements may include, e.g., "Artificial Intelligence", "Database Administration", "Education Services", "Help Desk Support", etc. These capabilities may be based on one or more requirements mandated in one or more solicitations that interest the prime member (and the company associated with the prime members). It is noted that, when the software application performs the step of matching a prime member (and a solicitation associated with the prime member) with various teaming members, the application may analyze or track one or more of these capabilities and compare these capabilities with the capabilities of the various teaming members in order to identify teaming member matches. Thereafter, the software application may rank the identified teaming members such that the teaming members that have the highest number of the capabilities may be ranked at a top position, followed by teaming members having fewer capabilities. In other embodiments, a prime member may upload a solicitation document via the software application, in response to which the software application may analyze the solicitation document and extract a plurality of capabilities. Additionally, other data such as, e.g., Title, Status, IDIQ, Agency, Requirement Clearance, and so forth, may also be extracted automatically and without user intervention.

Figure 34:
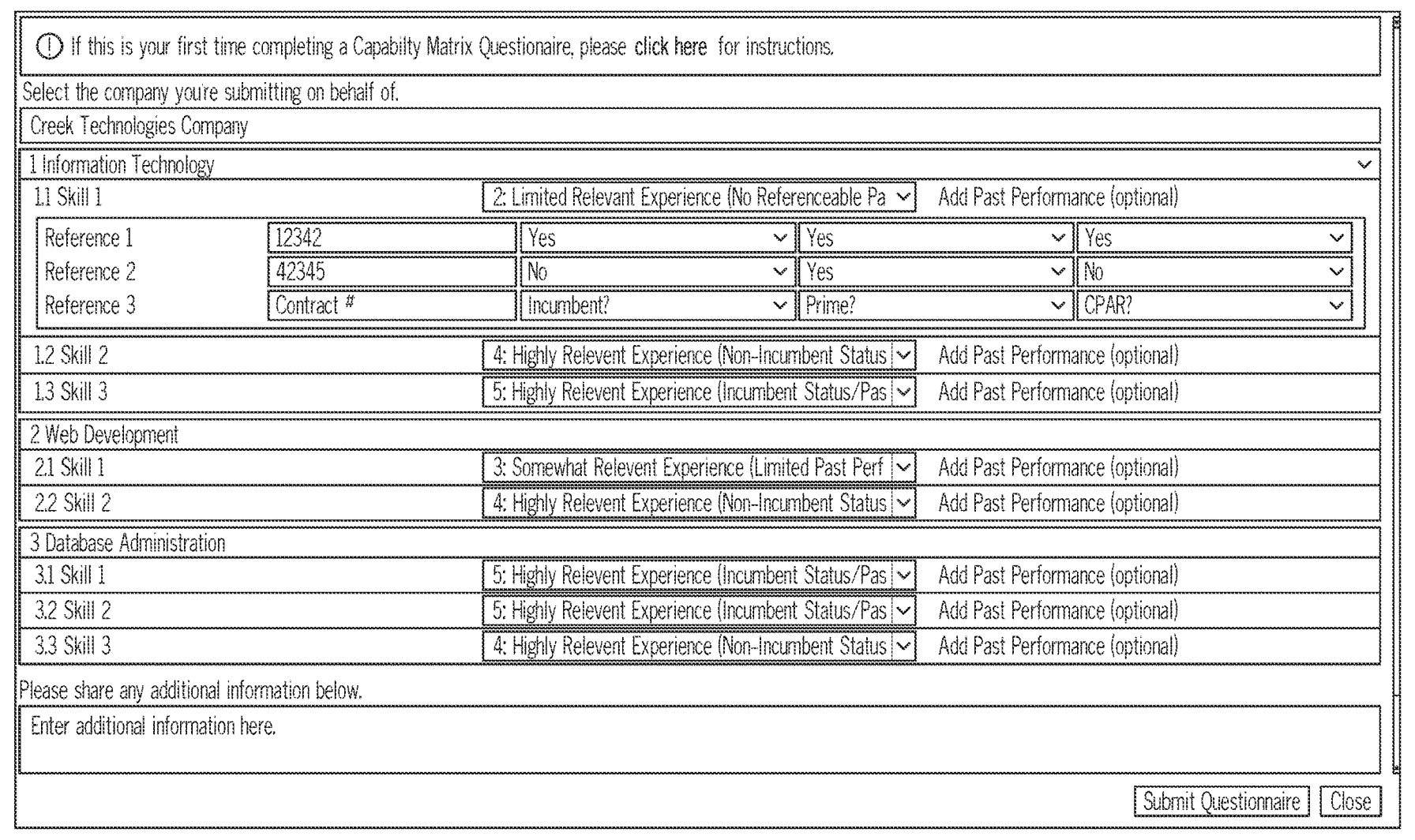

FIG. 34 depicts an example page on which additional details specific to various capability requirements may be specified, according to one or more embodiments described and illustrated herein. For example, a list of capabilities, specified by a prime member and submitted on behalf of "Creek Technologies Company", may include additional text fields and drop down menus. Using these text fields and drop down menus, a prime member may specify the relevance of a particular capability, e.g., "Information Technology" may be designated as highly relevant, whereas "Web Development" may be designated as "Somewhat relevant". Multi-tiered relevance designations for each skillset or capability are also contemplated.

FIG. 35 depicts an example capability matrix team strength page of the software application of the present disclosure, according to one or more embodiments described and illustrated herein. As shown, the example capability matrix team strength page may provide a likelihood of a combination of a prime member and a teaming member potentially winning a proposal. For example, a team strength of a combination of the prime member and the teaming member may be 3.7, which indicates a moderate strength capability combination and a moderate probability that the combination of this prime member and teaming member will win a bid for a particular solicitation. Additionally, a combined strength score for each particular skillset or capabilities may also be provided. For example, the combined strength score for the skillset of information technology may be 3.7, while the respective combined strength scores for Web Development and Database Administration may be 3.5 and 4.7.

FIG. 36 depicts another example capability matrix team strength page of the software application of the present disclosure in which a comparison of a strength of a particular company with a variety of other companies is provided, according to one or more embodiments described and illustrated herein. For example, in FIG. 36, a strength score of Creek Technologies relative to Riverscape Software, Inc., and Lions Technology Services, is provided. A user may, at a glance, be able to determine the relative strengths of these three companies across a number of capabilities. Also, a combined score for each capability based on the individual scores of each company may also be determined. In this way, a prime member may, at a glance, be able to have a understanding of the likelihood of winning a bid for a solicitation based on a number potential teaming members.

FIG. 37 depicts a solicitation information page on which additional details specific to a solicitation may be input, according to one or more embodiments described and illustrated herein. For example, details specific to a particular solicitation may be input, e.g., Type, Status, Title, IDIQ, Agency, NAICS Codes, Capability Requirements, Solicitation Contracts, and so forth.

Figure 38:
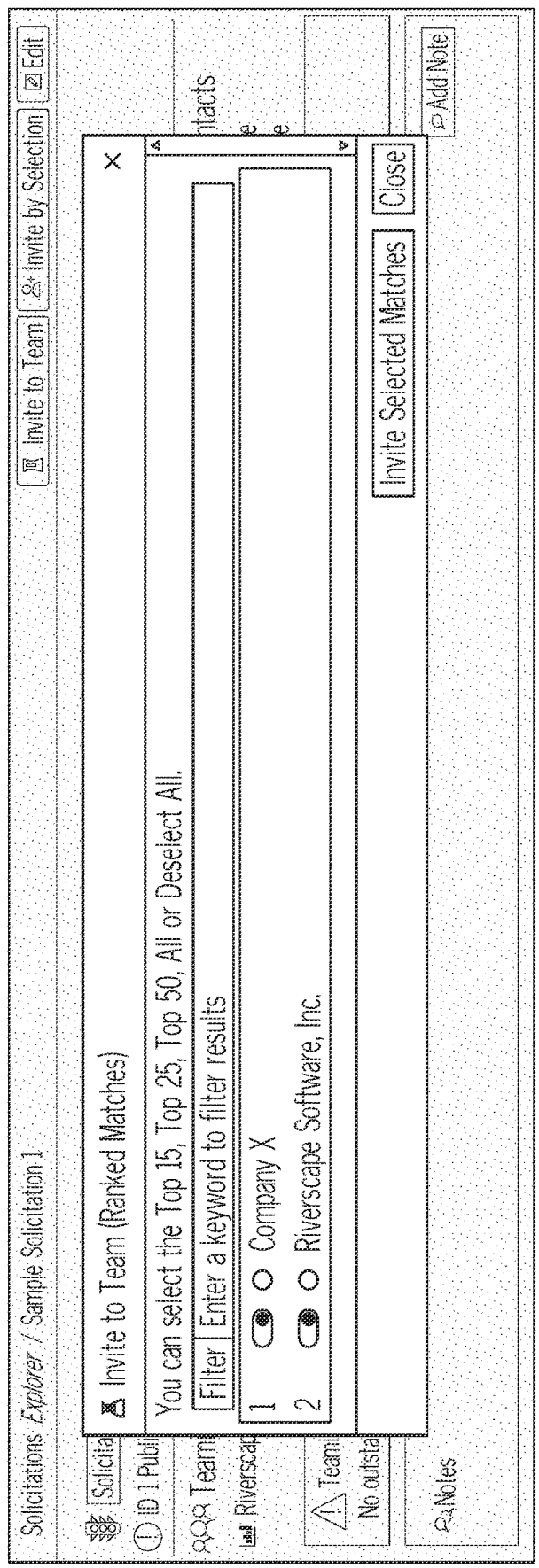
FIG. 38 illustrates another example page for inviting team members according to one or more embodiments described and illustrated herein.

FIG. 38 depicts an example solicitation page with which a prime member may interact in order to identify various potential teaming members, according to one or more embodiments described and illustrated herein. For example, upon selection of an icon labeled "invite by matching", a plurality of potential teaming members or partners may be identified. Additionally, these partners may be ranked based on the number of capabilities that each potential teaming member may possess. For example, Riverscape Software, Inc., may be ranked highest because this company may possess the most number of capabilities that are listed as requirements by a prime member, while Creek Technologies and Lions Technology Services may have the second and third highest number of capabilities that are listed as requirements by the prime member. It is noted that a number of additional companies may also be identified as potential matches (based on the analysis of the capabilities and requirements provided by the prime member). For example, upon selection of the "Invite All Matches" icon, all companies that have even one capability that is listed as a requirement by the prime member may be identified and provided to the prime member. Alternatively, upon selection of the "Invite Top 10 Matches" icon, only the top 10 companies that satisfy the capability requirements may be provided to the prime member.

Figure 39:
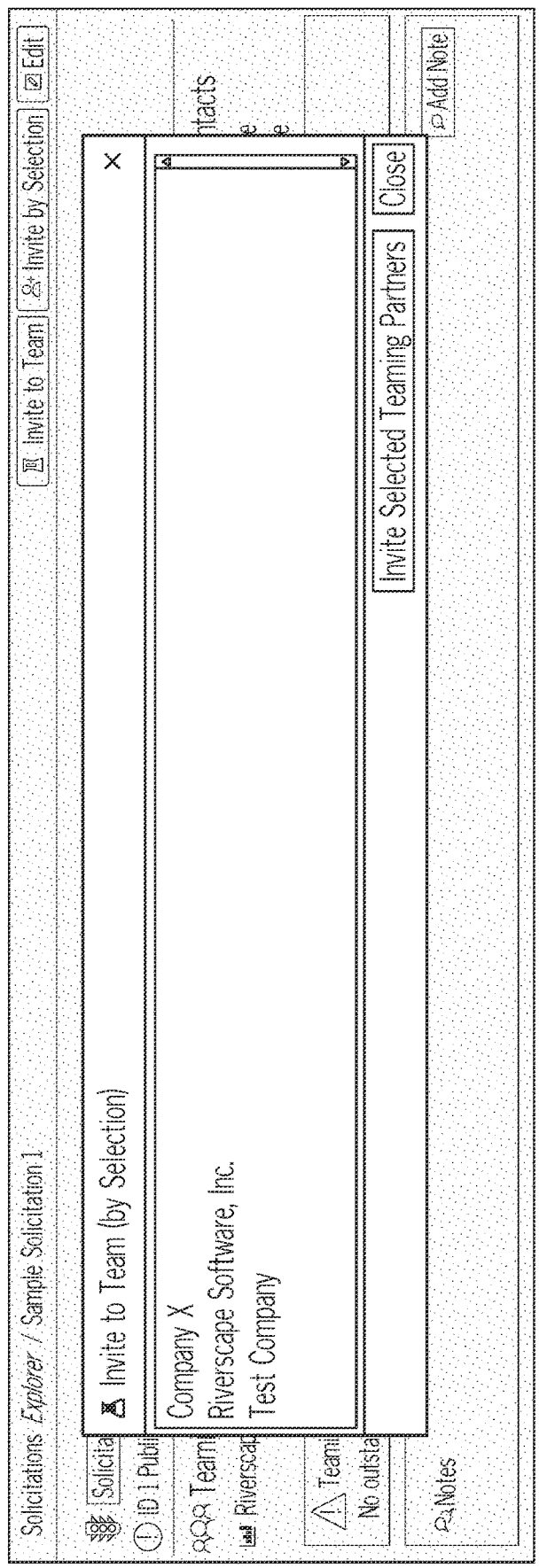
FIG. 39 illustrates another example page for inviting team members according to one or more embodiments described and illustrated herein.

FIG. 39 depicts an example page in which one or more of the teaming members that are listed as potential matches may be invited by a prime member. As show, invitations may be sent to one or all of the companies that are potential matches, namely Riverscape Software, Inc., Creek Technologies, and Lions Technology Services.

It should now be understood that embodiments of the present disclosure are directed to systems and methods for matching service providers having certain capabilities with solicitations having certain requirements. Embodiments further provide a proposal generator that enables a user to quickly search past proposals for sections that may be imported directly into a new proposal that is being drafted.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for responding to a solicitation comprising:
   one or more processors; and
   a non-transitory computer-readable medium storing instructions that cause the one or more processors to:
   receive a solicitation document, wherein the solicitation document includes a plurality of requirements;
   compare the plurality of requirements against a plurality of capabilities of a plurality of members;
   track and compare one or more of the plurality of capabilities with those among the plurality of members to identify one or more member matches;
   generate strength scores for each of at least two members of the plurality of members based at least in part on the comparison of the plurality of requirements against the plurality of capabilities, the at least two strength scores comprising an individual strength score for each of the plurality of requirements and a total strength score that is a summation of the individual strength scores;
   display the at least two members in an electronic display;
   display, in the electronic display, a user interface comprising a capability matrix builder page comprising a plurality of capability input fields that receive text input from a member and are each editable by the member via one or more selectable icons;
   match the plurality of capability input fields against the plurality of requirements of the solicitation document;
   rank, based on the matching, the at least two members corresponding to a predetermined number of matched plurality of capability input fields, wherein the rank is further based on a multi-tiered relevance designation relative to each of the plurality of capability input fields, the multi-tiered relevance designation being customized by the member and including a first degree of relevance for a first capability input field and a second degree of relevance for a second capability input field, the first degree of relevance being greater than the second degree of relevance; and
   activate, in the electronic display via selection of an activation icon in the user interface, the capability matrix to display the at least two members in accordance with the rank and the multi-tiered relevance designation including the first degree of relevance for the first capability input field and the second degree of relevance for the second capability input field, and the generated strength scores for the at least two members and a probability that the combination of the at least two members will win a bid for the solicitation.

2. The system of claim 1, wherein the instructions further cause the one or more processors to display, in the user interface, a plurality of solicitation requirement input fields for the solicitation document.

3. The system of claim 1, wherein the instructions further cause the one or more processors to receive a request to invite one of the plurality of members, and transmitting an invitation to the one of the plurality of members.

4. A method for responding to a solicitation comprising:
   receiving a solicitation document, wherein the solicitation document includes a plurality of requirements;
   comparing the plurality of requirements against a plurality of capabilities of a plurality of members;
   tracking and comparing one or more of the plurality of capabilities with those among the plurality of members to identify one or more member matches;
   generating strength scores for each of at least two members of the plurality of members based at least in part on the comparison of the plurality of requirements against the plurality of capabilities, the at least two strength scores comprising an individual strength score for each of the plurality of requirements and a total strength score that is a summation of the individual strength scores;
   displaying the at least two members in an electronic display;
   displaying, in the electronic display, a user interface comprising a capability matrix builder page comprising a plurality of capability input fields that receive text input from a member and are each editable by the member via one or more selectable icons;
   matching the plurality of capability input fields against the plurality of requirements of the solicitation document;
   ranking, based on the matching, the at least two members corresponding to a predetermined number of matched plurality of capability input fields, wherein the rank is further based on a multi-tiered relevance designation relative to each of the plurality of capability input fields, the multi-tiered relevance designation being customized by the member and including a first degree of relevance for a first capability input field and a second degree of relevance for a second capability input field, the first degree of relevance being greater than the second degree of relevance; and
   activating, in the electronic display via selection of an activation icon in the user interface, the capability matrix to display the at least two members in accordance with the rank and the multi-tiered relevance designation including the first degree of relevance for the first capability input field and the second degree of relevance for the second capability input field, and the generated strength scores for the at least two members and a probability that the combination of the at least two members will win a bid for the solicitation.

5. The method of claim 4, further comprising displaying, in the user interface, a plurality of solicitation requirement input fields for the solicitation document.

6. The method of claim 4, further comprising receiving a request to invite one of the plurality of members, and transmitting an invitation to the one of the plurality of members.

* * * * *